US010601554B2

United States Patent
Zhang et al.

(10) Patent No.: US 10,601,554 B2
(45) Date of Patent: Mar. 24, 2020

(54) PACKET TRANSMISSION METHOD AND USER EQUIPMENT

(71) Applicant: HUAWEI TECHNOLOGIES CO., LTD., Shenzhen, Guangdong (CN)

(72) Inventors: Zhong Zhang, Shenzhen (CN); Neng Yang, Shenzhen (CN); Maoqing Huang, Shenzhen (CN); Wei Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 38 days.

(21) Appl. No.: 15/926,174

(22) Filed: Mar. 20, 2018

(65) Prior Publication Data

US 2018/0212721 A1 Jul. 26, 2018

Related U.S. Application Data

(63) Continuation of application No. PCT/CN2016/099480, filed on Sep. 20, 2016.

(30) Foreign Application Priority Data

Sep. 21, 2015 (CN) .......................... 2015 1 0605226

(51) Int. Cl.
*H04L 1/18* (2006.01)
*H04L 1/08* (2006.01)
*H04L 29/06* (2006.01)

(52) U.S. Cl.
CPC .............. *H04L 1/1887* (2013.01); *H04L 1/08* (2013.01); *H04L 1/18* (2013.01); *H04L 1/189* (2013.01);
(Continued)

(58) Field of Classification Search
CPC ....... H04L 1/0001; H04L 1/18; H04L 1/1816; H04L 1/1864; H04L 1/189; H04L 1/1887; H04L 1/1809
See application file for complete search history.

(56) References Cited

U.S. PATENT DOCUMENTS

2007/0008883 A1   1/2007  Kobayashi
2010/0037116 A1   2/2010  Grove et al.
(Continued)

FOREIGN PATENT DOCUMENTS

CN   101296161 A   10/2008
CN   101631065 A    1/2010
(Continued)

OTHER PUBLICATIONS

RFC2581 M. Allman et al.,"TCP Congestion Control"Network Working Group,dated Apr. 1999,total 12 pages.
(Continued)

*Primary Examiner* — Shelly A Chase
(74) *Attorney, Agent, or Firm* — Huawei Technologies Co., Ltd.

(57) ABSTRACT

The present invention discloses a packet transmission method and user equipment. The method includes: transmitting, by a sending node, multiple packets to a receiving node; receiving multiple acknowledgement packets from the receiving node; after determining, based on the received multiple acknowledgement packets, that a first packet is lost, retransmitting the first packet; and if it is detected that the retransmitted packet is lost, continuously retransmitting, by the sending node, the first packet to the receiving node in a preset time interval for at least twice. According to the solutions of the present invention, the retransmitted packet can be detected and recovered in time after the retransmitted packet is lost, thereby reducing a quantity of times of timeout retransmission, improving a transmission rate,
(Continued)

moreover, reducing a packet loss probability of a retransmitted packet, and further reducing a probability of timeout retransmission.

9 Claims, 11 Drawing Sheets

(52) U.S. Cl.
CPC .......... *H04L 1/1809* (2013.01); *H04L 1/1874* (2013.01); *H04L 69/163* (2013.01)

(56) References Cited

U.S. PATENT DOCUMENTS

| | | |
|---|---|---|
| 2011/0110230 A1 | 5/2011 | Zhuang |
| 2011/0125915 A1 | 5/2011 | Takei et al. |
| 2011/0310895 A1 | 12/2011 | Grove et al. |
| 2012/0099599 A1 | 4/2012 | Keraenen et al. |
| 2014/0162544 A1 | 6/2014 | Edge |
| 2014/0313996 A1* | 10/2014 | Suga ................ H04W 56/0045 370/329 |
| 2015/0109942 A1* | 4/2015 | Nguyen ............. H04L 43/0835 370/252 |
| 2016/0226628 A1* | 8/2016 | Stephenne ............ H04L 1/1816 |
| 2017/0325129 A1* | 11/2017 | Zhu ....................... H04W 28/20 |

FOREIGN PATENT DOCUMENTS

| | | |
|---|---|---|
| CN | 101753275 A | 6/2010 |
| CN | 102075436 A | 5/2011 |
| CN | 102480346 A | 5/2012 |
| CN | 103220091 A | 7/2013 |
| CN | 103401666 A | 11/2013 |
| CN | 103986548 A | 8/2014 |
| CN | 104660573 A | 5/2015 |
| EP | 1220486 A2 | 7/2002 |
| JP | 2005045469 A | 2/2005 |
| JP | 2007060345 A | 3/2007 |
| JP | 2010206608 A | 9/2010 |
| JP | 2016058909 A | 4/2016 |
| RU | 2543304 C2 | 2/2015 |
| WO | 2010013469 A1 | 2/2010 |
| WO | 2015094069 A1 | 6/2015 |

OTHER PUBLICATIONS

Beomjoon Kim et al.,"Retransmission Loss Recovery by Duplicate Acknowledgment Counting",IEEE Communications Letters, vol. 8, No. 1,dated Jan. 2004,total 3 pages.
RFC2018 M. Mathis et al.,"TCP Selective Acknowledgment Options",Network Working Group ,dated Oct. 1996, total 12 pages.
RFC2883 S. Floyd et al.,"An Extension to the Selective Acknowledgement (SACK) Option for TCP", ,dated Jul. 2000, total 17 pages.
RFC3517 E. Blanton et al.,"A Conservative Selective Acknowledgment (SACK)-based Loss Recovery Algorithm for TCP",Network Working Group ,dated Apr. 2003,total 13 pages.
RFC 6675 E. Blanton et al.,"A Conservative Loss Recovery Algorithm Based on Selective Acknowledgment (SACK) for TCP",Internet Engineering Task Force (IETF) ,dated Aug. 2012,total 15 pages.
RFC3782 S. Floyd et al.,"The NewReno Modification to TCPs Fast Recovery Algorithm", dated Apr. 2004,total 19 pages.
RFC6582 T. Henderson et al.,"The NewReno Modification to TCPs Fast Recovery Algorithm",Internet Engineering Task Force (IETF),dated Apr. 2012,total 16 pages.
RFC5827 M. Allman et al.,"Early Retransmit for TCP and Stream Control Transmission Protocol (SCTP)", Internet Engineering Task Force (IETF) ,dated Apr. 2010,total 15 pages.
Beomjoon Kim et al.,"Lost retransmission detection for TCP SACK",IEEE Communications Letters, vol. 8, No. 9, Sep. 2004,total 3 pages.
Hanaa A. Torkey et al.,"Enhanced Fast Recovery Mechanism for improving TCP NewReno",ICCTA 2008, Oct. 11-13, 2008, Alexandria, Egypt,total 4 pages.
Eldad Perahia et al. Next Generation Wireless LANs, Cambridge University Press, 2008. total 416 pages.

* cited by examiner

TCP packet format

PACKET TRANSMISSION METHOD AND USER EQUIPMENT

CROSS-REFERENCE TO RELATED APPLICATIONS

This application is a continuation of International Application No. PCT/CN2016/099480, filed on Sep. 20, 2016, which claims priority to Chinese Patent Application No. 201510605226.9, filed on Sep. 21, 2015. The disclosures of the aforementioned applications are hereby incorporated by reference in their entireties.

TECHNICAL FIELD

The present invention relates to the field of communications technologies, and in particular, to a packet transmission method and user equipment.

BACKGROUND

In computer network communication, a packet loss recovery algorithm plays a very significant role. The packet loss recovery algorithm is an important algorithm that ensures reliability of data transmission in a transmission control protocol (TCP) stack, is an error tolerance mechanism when a data packet is lost, and directly affects data transmission efficiency and utilization of a network bandwidth. RFC2581 defines and describes a typical packet loss recovery algorithm, mainly including timeout retransmission and fast retransmission. Timeout retransmission is an important mechanism for ensuring data reliability in the TCP protocol. A principle of timeout retransmission is: A sending node enables a timeout timer after sending a packet, and after the timeout timer expires, if the sending node still does not receive an acknowledgement packet (ACK for short) indicating that the packet has been correctly received, the sending node resends the packet. The re-sent packet is also generally referred to as a retransmitted packet. Fast retransmission is an optimized mechanism of timeout retransmission. If a transmit end receives more than N (generally, N is equal to 3) repeated ACKs, it is determined that a packet is lost, and the lost packet is retransmitted immediately. In the fast retransmission mechanism, packet retransmission can be performed before a retransmission timer expires, thereby greatly improving the data transmission efficiency.

Avoiding unnecessary timeout retransmission in TCP transmission is always a research hotspot in the academic circles and the industrial circles. However, in most of current TCP protocol stacks, there is no mechanism for detecting loss of a retransmitted packet. If a retransmitted packet is lost, timeout retransmission occurs inevitably, and consequently, the transmission efficiency of a TCP connection is greatly reduced.

Currently, algorithms related to loss detection and recovery of a retransmitted packet mainly include a duplicate acknowledgement counting (DAC) algorithm and a selective acknowledgment plus (SACK+) algorithm. Both the DAC algorithm and the SACK+ algorithm are asymmetric TCP acceleration algorithms, and need to be deployed only at a transmit end, and basic ideas of them are very similar.

A main principle of the DAC algorithm is as follows: When a packet is retransmitted, the transmit end estimates a quantity n of packets currently transmitted in a network, and counts a quantity of repeated ACKs received after packet retransmission, where a packet that is already sent, that is not acknowledged by a receive end, and that is not determined by the transmit end as a lost packet is defined as a packet that is being transmitted in a network; and if a cumulative acknowledgment is not updated after more than n ACKs are received, determines that a currently retransmitted packet is lost, and immediately retransmits the packet again without waiting for timeout retransmission.

As shown in FIG. 1, it is assumed that in a send window, a packet whose sequence number is 3 is lost. As shown in step 101 in FIG. 1, after receiving three repeated ACKs, a transmit end starts fast retransmission to retransmit the packet whose sequence number is 3, and estimates, by using the DAC algorithm, a quantity of packets that are being transmitted in the network. A feasible estimation method is as follows (it should be noted that an estimation method is not limited to this estimation method): The transmit end learns that a largest sequence number of sent packets is 8, a sequence number of a received cumulative acknowledgment is 2, and three repeated acknowledgements are received, the transmit end determines that one packet is lost, and estimates that a quantity of packets that are being transmitted in the network is equal to 8−2−3−1=2. Then, as shown in step 102 in FIG. 1, the transmit end counts received repeated ACKs after retransmission. When the transmit end receives the third repeated ACK after retransmission, if the sequence number of the cumulative acknowledgment is still 2 and is not updated, the transmit end determines that the retransmitted packet is lost. Finally, as shown in step 103 in FIG. 1, the transmit end immediately retransmits the packet whose sequence number is 3 and does not need to wait for timeout of the retransmission timer, thereby avoiding entering timeout retransmission.

A principle of the SACK+ algorithm is similar to that of the DAC algorithm. A main difference is that in the SACK+ algorithm, it is determined, by using selection acknowledgement information carried in a SACK option in an acknowledgement packet, whether a retransmitted packet is lost.

However, it is found through testing that regardless of the DAC algorithm or the SACK+ algorithm, a probability that loss of a retransmitted packet cannot be detected in time is large. As a result, the retransmitted packet cannot be detected and recovered by the transmit end in time after being lost. Consequently, timeout retransmission is triggered. In a scenario of a high packet loss rate, frequent timeout retransmission causes an increase in a transmission delay and a sharp decrease in a transmission rate.

SUMMARY

Embodiments of the present invention provide a packet transmission method, a sending apparatus, and a communications system, to reduce a probability of timeout retransmission of a packet, reduce a packet transmission delay, and improve a packet transmission rate.

To achieve the foregoing objectives of the present invention, according to a first aspect, an embodiment of the present invention provides a packet transmission method, where the method includes: transmitting, by a sending node, multiple packets to a receiving node by using a communications link between the sending node and the receiving node; after determining that a first packet in the multiple packets is lost, retransmitting, by the sending node, the first packet; and after determining, based on an acknowledgement packet received after the first packet is retransmitted, that the retransmitted packet is lost, retransmitting the first packet again, and sending the first packet for at least once in a first time interval after retransmitting the first packet again.

In a first possible implementation manner of the first aspect, the method further includes: receiving one or more acknowledgement packets from the receiving node, and determining, according to an ack field or an extension field carried in the one or more acknowledgement packets, that the first packet is lost.

With reference to the first aspect or the first possible implementation manner of the first aspect, in a second possible implementation manner, the method further includes: sending, by the sending node, a second packet in the first time interval, where the second packet is a packet that is not sent by the sending node.

According to a second aspect, an embodiment of the present invention provides a packet transmission method, including: transmitting, by a sending node, multiple packets to a receiving node by using a communications link between the sending node and the receiving node; after determining that a first packet in the multiple packets is lost, retransmitting, by the sending node, the first packet; after determining, based on an acknowledgement packet received after the first packet is retransmitted, that the retransmitted packet is lost, retransmitting the first packet again, and determining whether a sending buffer is empty; and if the sending buffer is not empty, sending, by the sending node, at least one packet in the sending buffer in a first time interval after retransmitting the first packet again, where the packet in the sending buffer is a packet that is not sent by the sending node.

In a first possible implementation manner of the second aspect, the method further includes: if the sending buffer is empty, sending, by the sending node, the first packet in the first time interval for at least once.

With reference to the second aspect or the first possible implementation manner of the second aspect, in a second possible implementation manner, the determining, by the sending node based on an acknowledgement packet received after the first packet is retransmitted, that the retransmitted packet is lost includes: determining, by the sending node according to an ack field or an extension field carried in the acknowledgement packet received after the first packet is retransmitted, that a retransmitted packet is lost, where the retransmitted packet is the retransmitted first packet.

According to a third aspect, an embodiment of the present invention provides a packet transmission method, including: transmitting, by a sending node, multiple packets to a receiving node by using a communications link between the sending node and the receiving node; after determining that a first packet in the multiple packets is lost, retransmitting, by the sending node, the first packet; after determining, based on an acknowledgement packet received after the first packet is retransmitted, that the retransmitted packet is lost, retransmitting, by the sending node, the first packet again, and determining whether a sending buffer is empty, or whether a current congestion control policy allows sending of a new packet; and if the sending buffer is empty, or the current congestion control policy does not allow sending of the new packet, sending, by the sending node, the first packet for at least once in a first time interval after retransmitting the first packet again.

In a first possible implementation manner of the third aspect, the method further includes: if the sending buffer is not empty, and the current congestion control policy allows sending of the new packet, sending, by the sending node, at least one packet in the sending buffer in the first time interval.

In any one of the foregoing aspects or any one of the possible implementation manners of any one of the foregoing aspects, the first time interval is greater than or equal to 0, and is less than a period of a timeout timer of the first packet; and the sending node has not received, in the first time interval, an acknowledgement packet used to indicate that the first packet retransmitted again is lost.

In any one of the foregoing aspects or any one of the possible implementation manners of any one of the foregoing aspects, the communications link between the sending node and the receiving node is a TCP connection.

In any one of the foregoing aspects or any one of the possible implementation manners of any one of the foregoing aspects, the packet in the sending buffer is a packet that is not sent by the sending node.

With reference to any one of the foregoing aspects or any one of the possible implementation manners of any one of the foregoing aspects, the sending node retransmits the lost first packet in a preset time interval after the sending node detects that the retransmitted packet is lost, where the preset time interval uses a moment at which the sending node detects that the retransmitted first packet is lost as a start point, and the preset time interval is greater than or equal to 0, and is less than a period of a timeout timer of the first packet; or the preset time interval approaches 0.

According to a fourth aspect, an embodiment of the present invention provides user equipment, including: a wireless modem, a processor, an antenna, and a TCP protocol stack, where the wireless modem is connected to the antenna; the TCP protocol stack is configured to: encapsulate, under the control of the processor, data of an application program running on the user equipment into multiple packets, and send the multiple packets to the wireless modem; the wireless modem is configured to: modulate the received packets to analog signals, and send the analog signals to a server by using the antenna; and the TCP protocol stack is further configured to: upon determination that a first packet in the multiple packets is lost, retransmit the first packet to the server by using the wireless modem and the antenna, and after determining, based on an acknowledgement packet received after the first packet is retransmitted, that the retransmitted packet is lost, retransmit the first packet again, and send the first packet to the server for at least once in a first time interval after retransmitting the first packet again.

In a first possible implementation manner of the fourth aspect, the TCP protocol stack is further configured to send a second packet in the first time interval by using the wireless modem and the antenna, where the second packet is a packet that is not sent by the user equipment.

According to a fifth aspect, an embodiment of the present invention provides user equipment, including: a wireless modem, a processor, an antenna, and a TCP protocol stack, where the wireless modem is connected to the antenna; the TCP protocol stack is configured to: encapsulate, under the control of the processor, data of an application program running on the user equipment into multiple packets, and send the multiple packets to the wireless modem; the wireless modem is configured to: modulate the received packets to analog signals, and send the analog signals to a server by using the antenna; and the TCP protocol stack is further configured to: upon determination that a first packet in the multiple packets is lost, retransmit the first packet to the server by using the wireless modem and the antenna, and determine, based on an acknowledgement packet received after the first packet is retransmitted, that the retransmitted packet is lost; retransmit the first packet to the server again, and determine whether a sending buffer is empty; and if the sending buffer is not empty, send at least one packet in the sending buffer to the server in a first time interval after retransmitting the first packet again.

In a first possible implementation manner of the fifth aspect, the TCP protocol stack is further configured to: if the sending buffer is empty, send the first packet to the server in the first time interval for at least once by using the wireless modem and the antenna.

With reference to the fifth aspect or the first possible implementation manner of the fifth aspect, in a second possible implementation manner, the TCP protocol stack is specifically configured to determine, according to an ack field or an extension field carried in the acknowledgement packet received after the first packet is retransmitted, that the retransmitted packet is lost.

According to a sixth aspect, an embodiment of the present invention provides user equipment, including: a wireless modem, a processor, an antenna, and a TCP protocol stack, where the wireless modem is connected to the antenna; the TCP protocol stack is configured to: encapsulate, under the control of the processor, data of an application program running on the user equipment into multiple packets, and send the multiple packets to the wireless modem; the wireless modem is configured to: modulate the received packets to analog signals, and send the analog signals to a server by using the antenna; and the TCP protocol stack is further configured to: upon determination that a first packet in the multiple packets is lost, retransmit the first packet to the server by using the wireless modem and the antenna, and determine, based on an acknowledgement packet received after the first packet is retransmitted, that the retransmitted packet is lost; retransmit the first packet to the server again, and determine whether a sending buffer is empty, or whether a current congestion control policy allows sending of a new packet; and if the sending buffer is empty, or the current congestion control policy does not allow sending of the new packet, send the first packet to the server for at least once in a first time interval after retransmitting the first packet again.

In a first possible implementation manner of the sixth aspect, the TCP protocol stack is further configured to: if the sending buffer is not empty, and the current congestion control policy allows sending of the new packet, send at least one packet in the sending buffer to the server in the first time interval by using the wireless modem and the antenna.

In the fourth to the sixth aspects or any one of the possible implementation manners of the fourth to the sixth aspects, the first time interval is greater than or equal to 0, and is less than a period of a timeout timer of the first packet; and the user equipment has not received, in the first time interval, an acknowledgement packet used to indicate that the first packet retransmitted again is lost.

In the fourth to the sixth aspects or any one of the possible implementation manners of the fourth to the sixth aspects, the packet in the sending buffer is a packet that is not sent by the user equipment; and the retransmitted packet is the first packet retransmitted by the user equipment the first time when the user equipment detects that the first packet is lost.

In the fourth to the sixth aspects or any one of the possible implementation manners of the fourth to the sixth aspects, the TCP protocol stack is specifically configured to retransmit the first packet to the server by using the wireless modem and the antenna in a preset time interval upon determination that the first packet in the multiple packets is lost, where the preset time interval is greater than or equal to 0, and is less than a period of a timeout timer of the first packet; or the preset time interval approaches 0.

According to a seventh aspect, an embodiment of the present invention provides user equipment, including: a sending unit, configured to send multiple packets to a receiving node in communication connection with the user equipment; a receiving unit, configured to receive multiple acknowledgement packets from the receiving node; and a processing unit, configured to: determine, according to the multiple acknowledgement packets received by the receiving unit, that a first packet in the multiple packets is lost; trigger the sending unit to retransmit the first packet to the receiving node; and determine, according to an acknowledgement packet received by the receiving unit after the first packet is retransmitted, that the retransmitted packet is lost, where the sending unit is further configured to: after the processing unit determines that the retransmitted packet is lost, continuously send the first packet in a first time interval for at least twice.

In a first possible implementation manner of the seventh aspect, the sending unit is further configured to send a second packet in the first time interval, where the second packet is a packet that is not sent by the sending unit.

According to an eighth aspect, an embodiment of the present invention provides user equipment, including: a sending unit, configured to send multiple packets to a receiving node in communication connection with the user equipment; a receiving unit, configured to receive multiple acknowledgement packets from the receiving node; and a processing unit, configured to: determine, according to the multiple acknowledgement packets received by the receiving unit, that a first packet in the multiple packets is lost; trigger the sending unit to retransmit the first packet to the receiving node; and determine, according to an acknowledgement packet received by the receiving unit after the first packet is retransmitted, that the retransmitted packet is lost, where the sending unit is further configured to: after the processing unit determines that the retransmitted packet is lost, retransmit the first packet again, and determine whether a sending buffer is empty; and if the sending buffer is not empty, send at least one packet in the sending buffer in a first time interval after retransmitting the first packet again.

In a first possible implementation manner of the eighth aspect, the sending unit is further configured to: if the sending buffer is empty, send the first packet in the first time interval for at least once.

According to a ninth aspect, an embodiment of the present invention provides user equipment, including: a sending unit, configured to send multiple packets to a receiving node in communication connection with the user equipment; a receiving unit, configured to receive multiple acknowledgement packets from the receiving node; and a processing unit, configured to: determine, according to the multiple acknowledgement packets received by the receiving unit, that a first packet in the multiple packets is lost; trigger the sending unit to retransmit the first packet to the receiving node; and determine, according to an acknowledgement packet received by the receiving unit after the first packet is retransmitted, that the retransmitted packet is lost, where the sending unit is further configured to: after the processing unit determines that the retransmitted packet is lost, retransmit the first packet again, and determine whether a sending buffer is empty, or whether a current congestion control policy allows sending of a new packet; and if the sending buffer is empty, or the current congestion control policy does not allow sending of the new packet, send the first packet for at least once in a first time interval after retransmitting the first packet again.

In a first possible implementation manner of the ninth aspect, the sending unit is further configured to: if the sending buffer is not empty, and the current congestion control policy allows sending of the new packet, send at least one packet in the sending buffer in the first time interval, where the packet in the sending buffer is a packet that is not sent by the sending unit.

In the eighth and the ninth aspects or any one of the possible implementation manners of the eighth and the ninth aspects, the sending unit is specifically configured to: after the processing unit determines that the retransmitted packet is lost, retransmit the first packet in a preset time interval again, where the preset time interval is greater than or equal to 0, and is less than a period of a timeout timer of the first packet; or the preset time interval approaches 0.

In the seventh to the ninth aspects or any one of the possible implementation manners of the seventh to the ninth aspects, the first time interval is greater than or equal to 0, and is less than a period of a timeout timer of the first packet; and the receiving unit has not received, in the first time interval, an acknowledgement packet used to indicate that the first packet retransmitted again is lost.

In the seventh to the ninth aspects or any one of the possible implementation manners of the seventh to the ninth aspects, the packet in the sending buffer is a packet that is not sent by the sending node.

In the seventh to the ninth aspects or any one of the possible implementation manners of the seventh to the ninth aspects, the sending unit is configured to retransmit the lost first packet in a preset time interval after it is detected that the retransmitted packet is lost, where the preset time interval is greater than or equal to 0, and is less than a period of a timeout timer of the first packet; or the preset time interval approaches 0.

According to a tenth aspect, an embodiment of the present invention provides a packet transmission method, including: transmitting, by a sending node, multiple packets to a receiving node by using a communications link between the sending node and the receiving node; receiving multiple acknowledgement packets from the receiving node; determining, based on the received multiple acknowledgement packets, that a first packet in the multiple packets is lost; and retransmitting the first packet to the receiving node, and sending the first packet in a second time interval for at least once, where the second time interval is greater than or equal to 0, and is less than a period of a timeout timer of the first packet; and the sending node has not received, in the second time interval, an acknowledgement packet used to indicate that the retransmitted first packet is lost.

According to an eleventh aspect, an embodiment of the present invention provides a packet transmission method, including: transmitting, by a sending node, multiple packets to a receiving node by using a communications link between the sending node and the receiving node; receiving multiple acknowledgement packets from the receiving node; determining, based on the received multiple acknowledgement packets, that a first packet in the multiple packets is lost; retransmitting the first packet to the receiving node, and determining whether a sending buffer is empty; and if the sending buffer is not empty, sending, by the sending node, at least one packet in the sending buffer in a second time interval, where the packet in the sending buffer is a packet that is not sent by the sending node, the second time interval is greater than or equal to 0, and is less than a period of a timeout timer of the first packet, and the sending node has not received, in the second time interval, an acknowledgement packet used to indicate that the retransmitted first packet is lost.

In a first possible implementation manner of the eleventh aspect, if the sending buffer is empty, the sending node sends the first packet in the second time interval for at least once.

According to a twelfth aspect, an embodiment of the present invention provides a packet transmission method, including: transmitting, by a sending node, multiple packets to a receiving node by using a communications link between the sending node and the receiving node; receiving multiple acknowledgement packets from the receiving node; determining, based on the received multiple acknowledgement packets, that a first packet in the multiple packets is lost; retransmitting, by the sending node, the first packet to the receiving node, and determining whether a sending buffer is empty, or whether a current congestion control policy allows sending of a new packet; and if the sending buffer is empty, or the current congestion control policy does not allow sending of the new packet, sending, by the sending node, the first packet in a second time interval for at least once.

In the tenth to the twelfth aspects or any one of the possible implementation manners of the tenth to the twelfth aspects, the second time interval uses a moment of retransmitting the first packet again as a start point, and uses a moment of receiving the first acknowledgement packet after the first packet is retransmitted again as an end point.

In the tenth to the twelfth aspects or any one of the possible implementation manners of the tenth to the twelfth aspects, the second time interval is greater than or equal to 0, and is less than a period of a timeout timer of the first packet, and the sending node has not received, in the second time interval, an acknowledgement packet used to indicate that the retransmitted first packet is lost.

In the tenth to the twelfth aspects or any one of the possible implementation manners of the tenth to the twelfth aspects, after determining that the first packet in the multiple packets is lost, the sending node retransmits the first packet in a preset time interval again, where the preset time interval is greater than or equal to 0, and is less than a period of a timeout timer of the first packet; or the preset time interval approaches 0.

An embodiment of the present invention further provides user equipment, where the user equipment includes a function unit configured to implement the method in the tenth to the twelfth aspects or any one of the possible implementation manners of the tenth to the twelfth aspects.

An embodiment of the present invention further provides a computer readable storage medium, where the storage medium stores program code, and the program code is used to perform steps of the method described in any one of the foregoing aspects or the possible implementation manners of any one of the foregoing aspects.

According to the packet transmission method and the user equipment that are provided in the embodiments of the present invention, after it is detected that a packet is lost, the lost packet is rapidly and redundantly sent for multiple times, or a new packet is immediately sent after the lost packet is retransmitted, so that the sending node can receive acknowledgement packets as continuously as possible after retransmitting the lost packet, and triggers a packet loss detection and recovery algorithm of the retransmitted packet in time according to the acknowledgement packets, so that the retransmitted packet can be detected and recovered in time after being lost, thereby reducing a quantity of times of timeout retransmission, and improving a transmission rate. In addition, if the retransmitted packet is lost again, timeout retransmission may be triggered. However, if the retransmitted packet is fast retransmitted for multiple times in a short time, a probability that the retransmitted packet is lost is exponentially reduced, thereby further reducing a probability of timeout retransmission.

BRIEF DESCRIPTION OF DRAWINGS

To describe the technical solutions in the embodiments of the present invention or in the prior art more clearly, the following briefly describes the accompanying drawings required for describing the embodiments or the prior art.

DESCRIPTION OF EMBODIMENTS

To make a person skilled in the art understand the technical solutions in the present invention better, the following clearly describes the technical solutions in the embodiments of the present invention with reference to the accompanying drawings in the embodiments of the present invention. Apparently, the described embodiments are merely a part rather than all of the embodiments of the present invention.

The technical solutions provided in the embodiments of the present invention may be typically applied to a communications system having a relatively high packet loss rate, for example, a global system for mobile communications (GSM) network, a code division multiple access (CDMA) network, a wideband code division multiple access (WCDMA) network, a general packet radio service (GPRS) network, a long term evolution (LTE) network, a software defined network (SDN), and a wireless sensor network (WSN).

Figure 2:
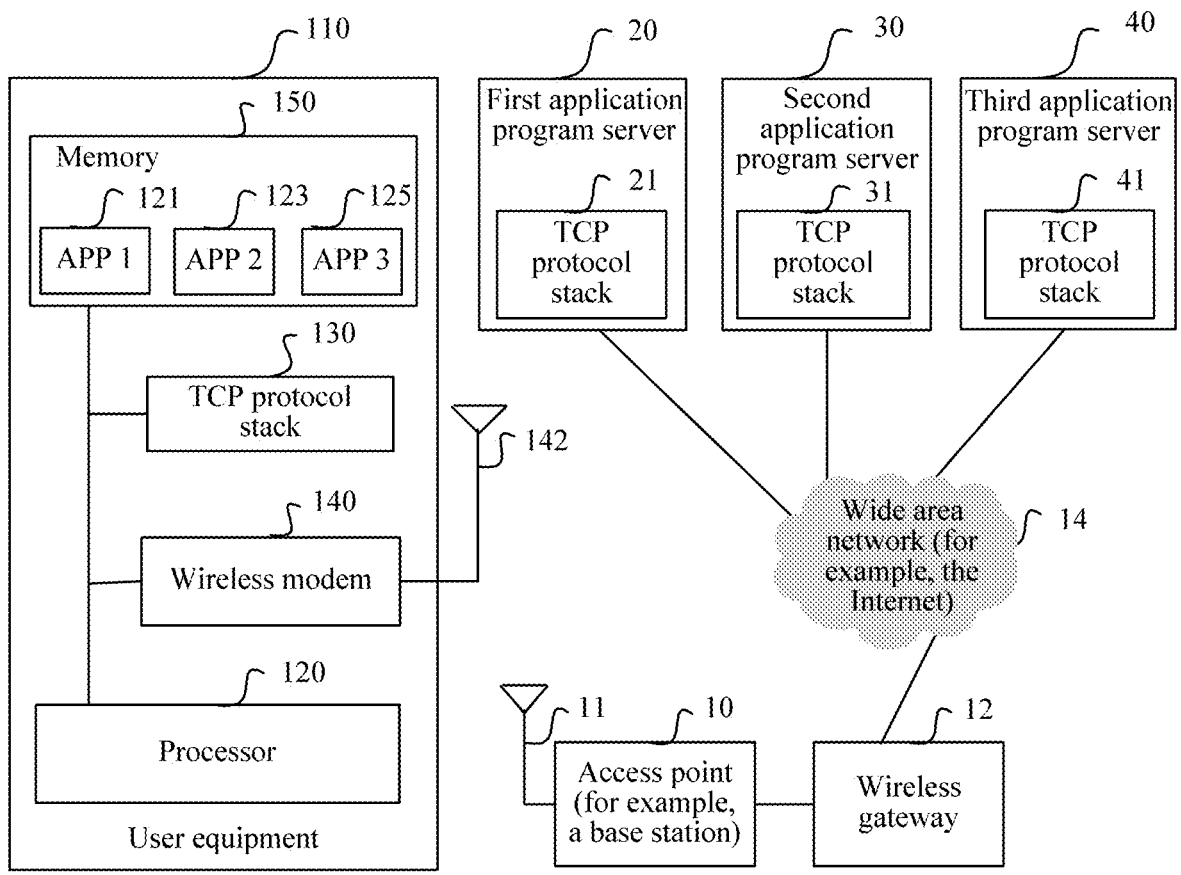
FIG. 2 is a schematic diagram of a communications system according to an embodiment of the present invention.

FIG. 2 is a simplified block diagram of a communications system 100 according to an embodiment of the present invention. The communications system 100 is merely used as an application scenario of the present invention, and should not be understood as a limitation to the application scenario of the present invention. It may be understood that the technical solutions provided in this embodiment of the present invention are applicable to any communications system that is based on a TCP/IP protocol stack. It should be noted that the TCP/IP protocol stack is a protocol stack implemented with reference to a division manner for a protocol level defined by a TCP/IP reference model. The TCP/IP protocol stack includes two core protocols: the transmission control protocol (TCP) and the Internet protocol (IP). In this embodiment of the present invention, implementation of the TCP protocol is optimized. It may be understood that the method of this embodiment of the present invention is also applicable to another reliable transmission protocol having a packet retransmission mechanism.

In the specification, claims, and accompanying drawings of the present invention, the terms "first", "second", "third", "fourth", and so on (if existent) are intended to distinguish between similar objects but do not necessarily indicate a specific order or sequence.

The communications system 100 includes: user equipment 110, an access point 10, a wireless access gateway 12, a wide area network 14, a first application server 20, a second application server 30, and a third application server 40. A person skilled in the art may understand that one communications system may generally include fewer or more components than components shown in FIG. 2, or include a component different from the components shown in FIG. 2. FIG. 2 merely shows the components more related to multiple implementation manners disclosed in this embodiment of the present invention.

For example, although three application servers 20, 30, and 40 are already described in FIG. 2, a person skilled in the art may understand that one communications system may include any quantity of application servers, or even does not include any application server. The application servers 20, 30, and 40 respectively include corresponding TCP protocol stacks 21, 31, and 41. Functions of the TCP protocol stacks 21, 31, and 41 may be respectively executed by proper combinations of software, hardware, and/or firmware running on the application servers 20, 30, and 40. The wide area network 14 may include: some of and/or any combination of a public network, a private network, and the Internet. The wireless access gateway 12 and the access point 10 may be included in one wireless network. For simplicity, another part of the wireless network is not described. The access point 10 further includes an antenna 11.

The user equipment 110 includes: a processor 120, a TCP protocol stack 130, a wireless modem 140, and a memory 150. The wireless modem 140 may be connected to an antenna 142. A person skilled in the art may understand that the TCP protocol stack 130 may be executed by a proper combination of software, hardware, and/or firmware. The TCP protocol stack 130, the wireless modem 140, and the antenna 142 cooperate with each other to complete transmission and reception of a packet under the control of the processor. In addition, a person skilled in the art may understand that user equipment may include fewer or more components than the components shown in FIG. 2. The user equipment 110 shown in FIG. 2 merely shows the components more related to multiple implementation manners disclosed in this embodiment of the present invention.

Generally, the memory 150 of the user equipment 110 stores application programs, for example, a first application program 121, a second application program 123, and a third application program 125. The first application program 121, the second application program 123, and the third application program 125 are respectively application programs on client sides of the first application program server 20, the second application program server 30, and the third application program server 40. The processor 120 may read and execute the application programs in the memory 150, to implement particular functions.

The TCP protocol stack uses a client-server communication model. The client requests and accepts a service provided by the server, for example, web page content. For example, the first application program 121 may be a web page browser requesting information from the first application program server 20.

Figure 3:
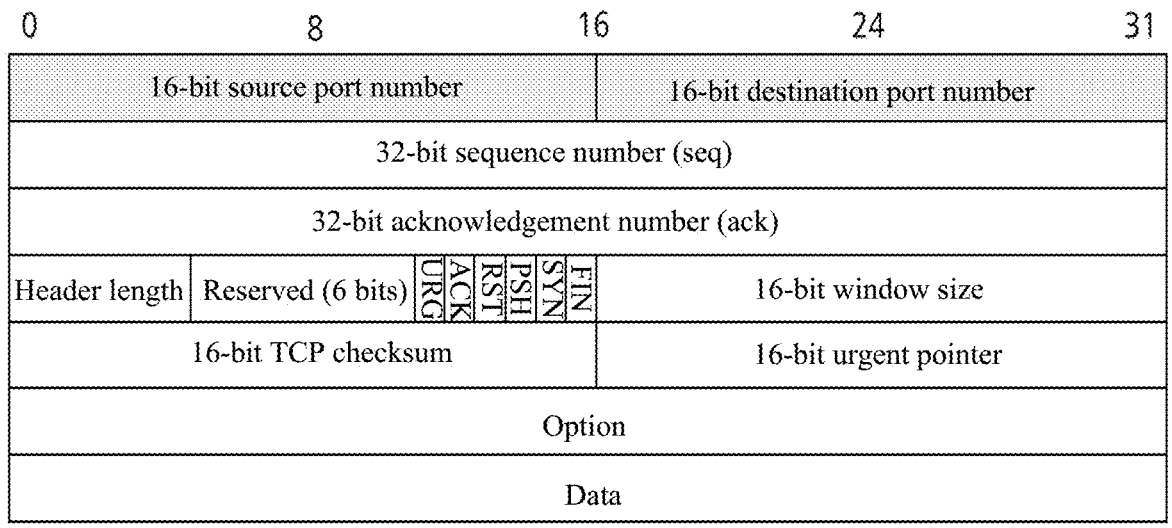
FIG. 3 is a schematic diagram of a TCP packet format.

The user equipment 110 in this embodiment of the present invention may be a mobile terminal, for example, a portable, wearable, or vehicular mobile device such as a mobile phone, an action camera, or a notebook computer, or may be a device such as a computer or a server, or may be a network device such as a router or a gateway. The user equipment 110 may establish a TCP connection to another user equipment, and further receive and transmit a packet by using the TCP connection. A format of a TCP packet is shown in FIG. 3. A source port and a destination port are configured to determine application processes of a transmit end and a receive end. A source port number, a destination port number, a source IP address, and a destination IP address may uniquely determine a TCP connection. A sequence number (generally seq for short) of a header of a TCP packet carries a sequence number of the first data byte in a payload of the packet. After receiving the TCP packet, a receiving node sends an acknowledgement packet (ACK) to a sending node by using a TCP connection. A field value of an acknowledge number (generally ack for short) of a header of the ACK packet represents a value of a "Sequence Number" field of a packet received by the receiving node, and also represents that the receive end has received all packets that are sent by the transmit end and whose values of "Sequence Numbers" are less than that of the "Acknowledge Number" of the ACK packet. A size of a window is used to indicate a size of a current receiving buffer area of the receive end. In addition, the header of the TCP packet further has six flag bits:

URG: urgent pointer field significant;

ACK: acknowledge number field significant;

PSH: immediate transmission to an application layer for processing;

RST: resetting when an abnormality occurs;

SYN: a synchronization flag, which is set to 1 upon connection establishment; and FIN: a termination flag, requesting to release a connection.

Figure 1:
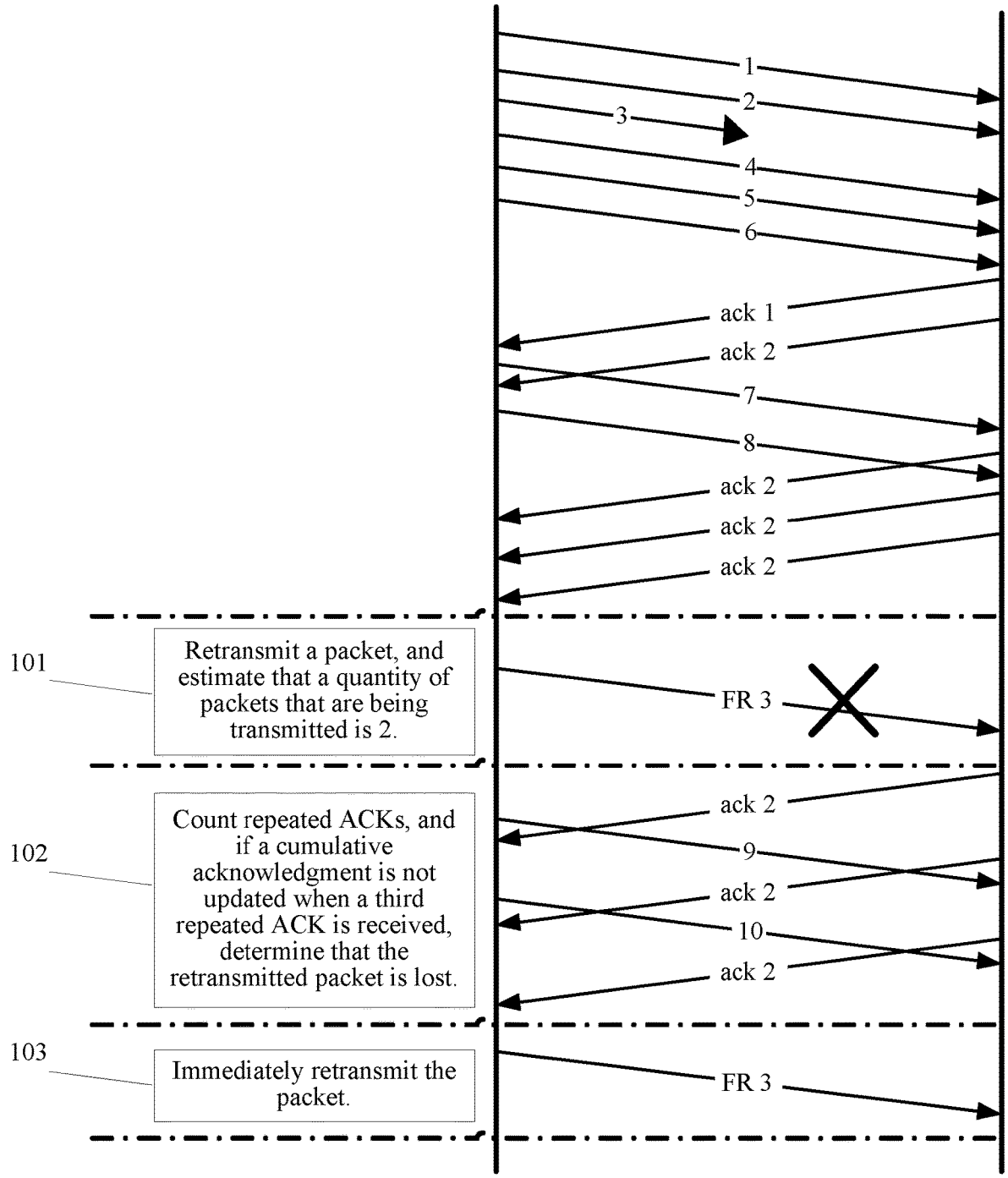
FIG. 1 is a schematic diagram of a packet loss recovery algorithm in the prior art.

The user equipment 110 may establish a TCP connection to the application program server 20 or another user equipment by using a wired network or a wireless network (for example, a Wi-Fi network, a WSN, or a cellular network). Establishment of the TCP connection to the application program server 20 may be initiated by a software application program (for example, a browser or the first application program 121 in FIG. 1). Specifically, the user equipment 110 and the application program server 20 may establish a TCP connection by using a three-way handshake. For example, the first application program 121 generates a socket open (socket open) command. The command is provided to a TCP protocol stack 120 of the user equipment 110, to trigger a TCP protocol stack 130 to establish a TCP connection to the application program server 20 by using three message exchanges. Then, the TCP protocol stack 130 notifies the upper-layer first application program 121 that the connection has been established. The TCP protocol stack of the application program server 20 also notifies an upper-layer application process that the connection has been established. Subsequently, the first application program 121 and the application program server 20 on the user equipment 110 may perform data transmission based on the established TCP connection. A person skilled in the art may understand that the user equipment 110 and the access point 10 access a radio service channel by using the corresponding antenna 142 and antenna 11.

Figure 4:
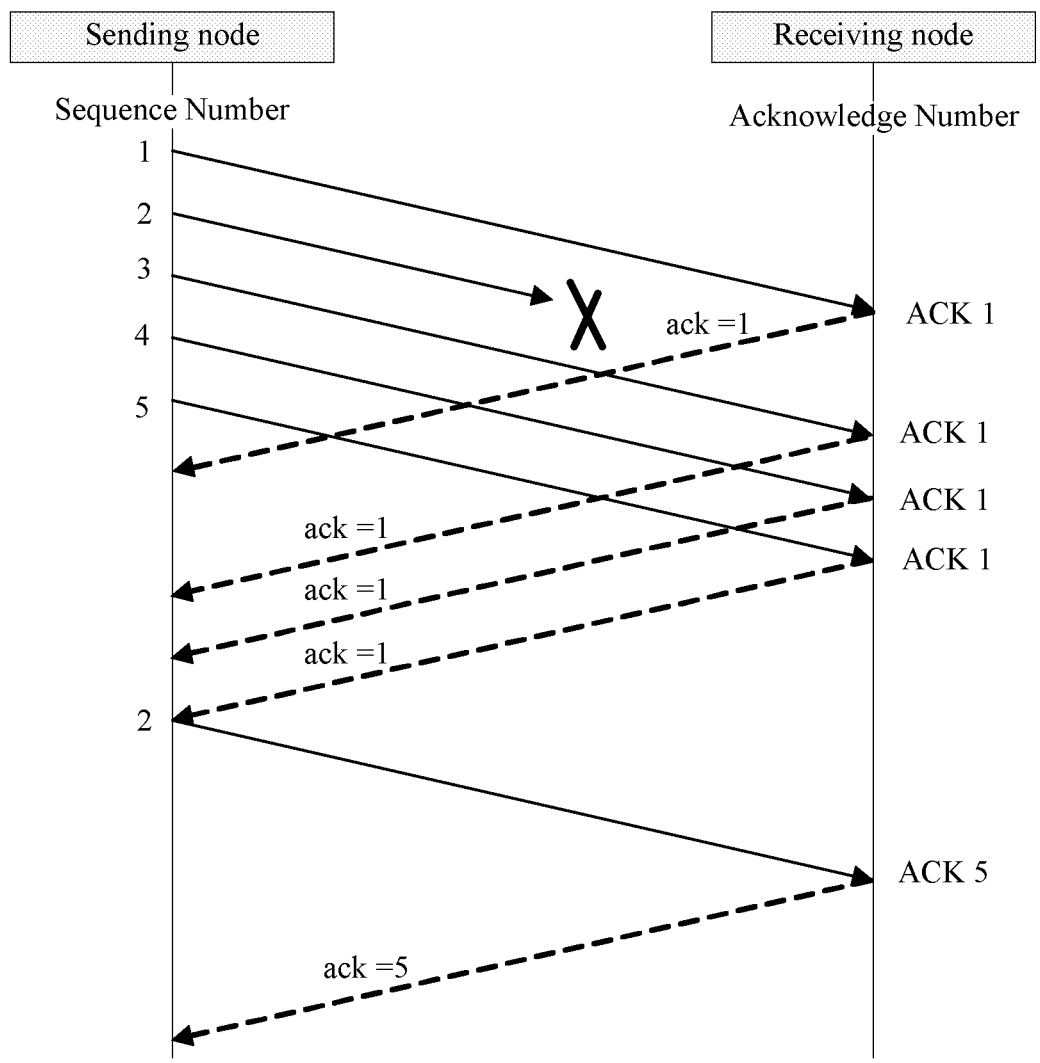
FIG. 4 is a diagram of a principle of a fast retransmission method in the prior art.

A TCP packet loss detection mechanism and a fast retransmission mechanism in the prior art are described below by using a specific instance. To simplify the description, in some embodiments of the present invention, one of two devices that have established a connection between each other is referred to as a sending node, and the other is referred to as a receiving node. It may be understood that the sending node and the receiving node may be any devices having data transmission and reception capabilities, for example, the foregoing user equipment or the foregoing application program server. As shown in FIG. 4, it is assumed that the sending node sends five packets whose sequence numbers are 1, 2, 3, 4, and 5. The packet whose sequence number is 1 (briefly referred to as packet 1) is the first received by the receiving node, and the receiving node returns an acknowledgement packet ACK1 whose acknowledge number ack=1. If packet 2 does not arrive at the receiving node for a reason, while the packet 3 arrives at the receiving node, the receiving node still returns ACK1. If packets 4 and 5 arrive at the receiving node, the receiving node still returns ACK1, because packet 2 does not arrive at the receiving node yet. Therefore, the sending node receives three acknowledgement packets whose acks are equal to 1, and determines that packet 2 is lost. Therefore, the sending node does not need to wait until a retransmission timer expires, and immediately retransmits the packet whose sequence number is 2 again. Then, the receiving node receives packet 2. In this case, because packets 3, 4, and 5 are already received, the receiving node returns an acknowledgement packet ACK5 whose acknowledge number is ack=5.

Timeout retransmission of a TCP packet is an important reason for low utilization of a network bandwidth and an increased transmission delay. An existing fast retransmission mechanism reduces a probability of timeout retransmission to some degree. However, if a retransmitted packet is lost again, and is not detected and recovered in time, timeout retransmission inevitably occurs. Although in the prior art, packet loss detection and recovery can be performed for a retransmitted packet by using, for example, DAC and SACK+ algorithms, it is found, through repeated tests and experiments, that after a packet loss detection and recovery algorithm of a retransmitted packet is introduced, a throughput is not obviously improved. It is found that a main reason for this result is that the existing retransmission packet loss detection and recovery method are not triggered in time in most cases. Consequently, after being lost, the retransmitted packet is not detected and recovered in time, and eventually, timeout retransmission occurs. Specifically, in an existing fast retransmission solution, it is determined, mainly according to an ACK packet received after a packet is retransmitted, whether the retransmitted packet is lost, to perform retransmission, so as to avoid entering timeout retransmission. However, if no packet is sent after the packet is retransmitted, the existing retransmission packet loss detection and recovery method may not be triggered. Eventually, timeout retransmission inevitably occurs. In this way, the probability of packet retransmission due to timeout is relatively large, causing a decrease in the throughput.

Figure 5:
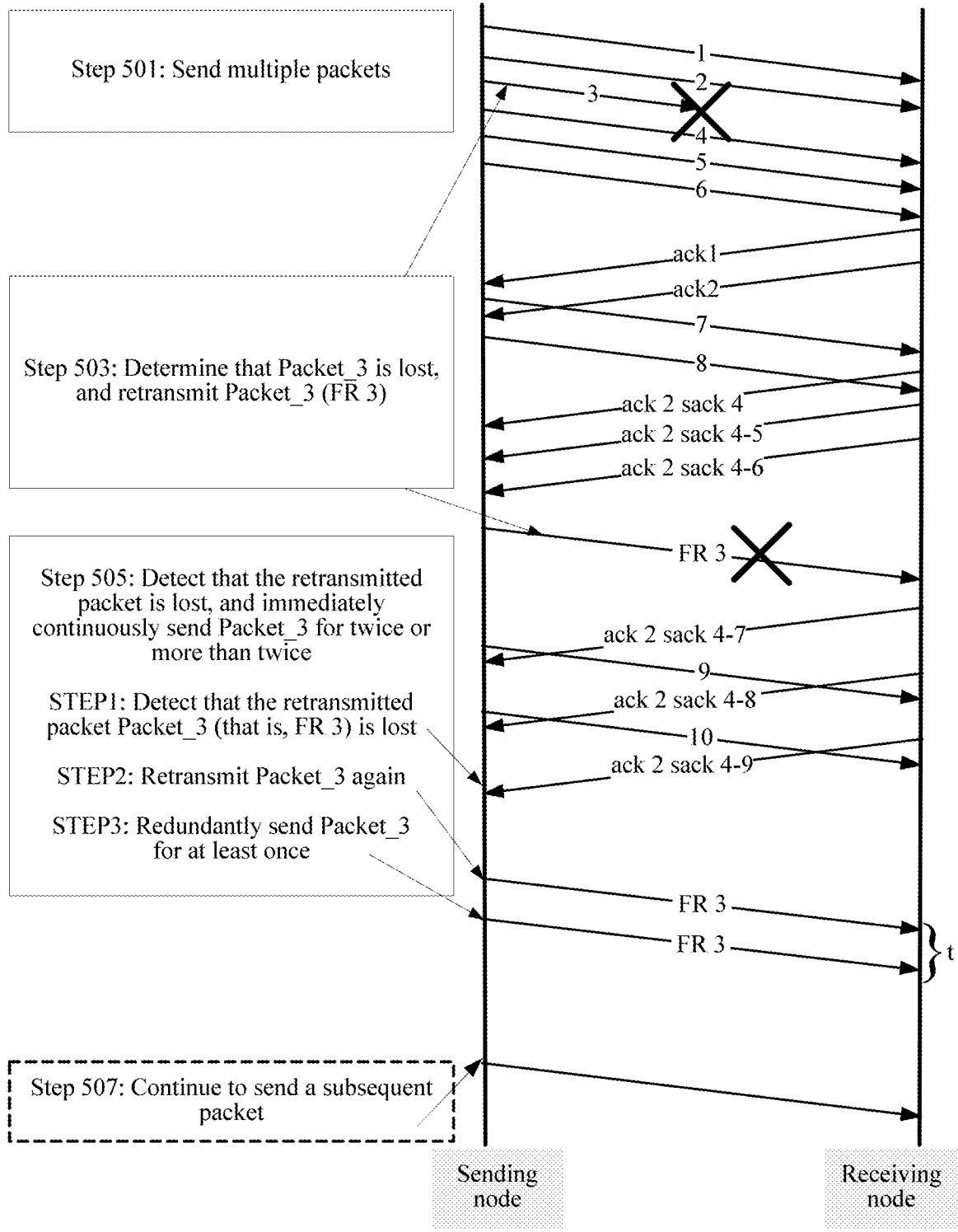
FIG. 5 is a schematic diagram of a packet transmission method according to an embodiment of the present invention.

To resolve the foregoing problems, an embodiment of the present invention provides a packet transmission method. After a packet is retransmitted, if it is detected that the retransmitted packet is lost, the lost packet is continuously sent for multiple times (including but not limited to twice), or a new packet is immediately sent after the lost packet is retransmitted. In this way, on one hand, it is avoided that a packet loss detection and recovery algorithm of the retransmitted packet is not triggered due to insufficient ACK packets. Therefore, the retransmitted packet can be detected and recovered in time after being lost, and a quantity of times of timeout retransmission is reduced. On the other hand, the lost packet is continuously retransmitted for multiple times, and timeout retransmission is triggered only when all retransmitted packets are lost. An actual effect is that a probability of a packet loss of the retransmitted packet is exponentially reduced, thereby further reducing the quantity of times of timeout retransmission, and improving a data transmission rate. As shown in FIG. 5, the packet transmission method provided in this embodiment of the present invention includes the following steps.

Step 501: A sending node transmits multiple packets (packets 1 to 8 shown in FIG. 5) to a receiving node by using a communications link between the sending node and the receiving node, and receives an acknowledgement packet from the receiving node, as shown by arrows from the receiving node to the sending node in FIG. 5. A packet sent by the sending node is a TCP packet. A sequence number field (generally seq for short) of a header of each packet carries a sequence number of the first data byte in a payload of the packet. Each time the receiving node receives a packet, the receiving node returns an acknowledgement packet (ACK) to the sending node, to indicate that the receiving node has correctly received the packet. Optionally, after step 501, the sending node may further record a largest sequence number of sent packets, for subsequent packet loss detection.

Step 503: After determining that a first packet is lost, the sending node immediately retransmits the lost first packet, where the retransmitted first packet (that is, FR 3) is also referred to as a retransmitted packet.

Generally, some packets in the multiple packets sent by the sending node cannot arrive at the receiving node due to a reason such as a network status, and therefore, are lost. The sending node may determine, according to the acknowledgement packet returned by the receiving node, whether a packet is lost. For example, the sending node determines, based on the received acknowledgement packet, that the first packet (for example, packet 3 shown in FIG. 5) in the multiple packets is lost.

Specifically, the sending node may determine, in multiple manners, that the first packet is lost. Using the fast retransmission mechanism shown in FIG. 4 as an example, if the sending node receives at least N (generally, N is equal to 3) acknowledgement packets whose ack values are the same, the sending node determines that the first packet whose sequence number is the same ack value plus 1 is lost. As shown in FIG. 5, if the sending node receives three acknowledgement packets whose ack field values are 2, the sending node determines that a packet whose sequence number is 3 is lost. For another example, in another embodiment, a SACK field is extended in the acknowledgement packet, and is used to indicate packet information of a receiving buffer, where the receiving buffer is used to temporarily store a received packet, and a value of the SACK field is defined as sack. For example, the sack may be a sequence number of a packet received by the receiving node. In this way, the sending node may learn, according to the sack of the acknowledgement packet returned by the receiving node, packets that are received by the receiving node, and packets that are not received by the receiving node, to further determine whether there is a lost packet.

Optionally, in step 503, the sending node may retransmit the lost first packet after a timeout timer of the first packet expires.

Step 505: After detecting that the retransmitted first packet is lost, the sending node immediately continuously sends the first packet for twice or more than twice. "Immediately" described in this embodiment of the present invention refers to within a preset time interval. That is, in step 505, the sending node continuously sends the lost first packet for twice or more than twice in the preset time interval after the sending node detects that the retransmitted packet is lost. The preset time interval herein should be greater than or equal to 0, and be less than or even much less than a period of the timeout timer of the first packet. For example, if the period of the timeout timer corresponding to the first packet is T, the preset time interval should be less than T, or less than T/2, or even less than T/4. Preferably, the preset time interval uses a moment at which the sending node detects that the retransmitted first packet is lost as a start point, and the preset time interval is equal to 0 or approaches 0. If the preset time interval is equal to 0, it indicates that an action of detecting that the retransmitted packet is lost and an action of sending the first packet are completed simultaneously or almost simultaneously. In addition, an interval (referred to as the first time interval hereinafter) of continuously sending the first packet for twice, that is, t in FIG. 5, should also be greater than or equal to 0, and be less than or even much less than the period of the timeout timer of the first packet. Moreover, the sending node has not received, in the first time interval (t), an acknowledgement packet used to indicate that the first packet retransmitted again is lost. That is, when the sending node has not received the acknowledgement packet used to indicate that the first packet retransmitted again is lost (cannot determine whether the first packet retransmitted again is lost), the sending node redundantly sends the first packet in the first time interval (t).

It should be noted that the timeout timer is used for TCP timeout retransmission, that is, when or after sending a packet, the sending node enables a timeout timer. A timing period of the timeout timer is T. If an acknowledgement packet corresponding to the packet is still not received when one timing period of the timeout timer ends, the sending node determines that the packet is lost, and performs timeout retransmission. Generally, a protocol stack sets a same timeout timer period for each packet, that is, each packet has a same timeout timer period. Specifically, in an embodiment, step 505 includes:

STEP1: The sending node determines, according to the acknowledgement packet received after the first packet is retransmitted, that the retransmitted first packet (that is, the retransmitted first packet FR3 in step 503) is lost. For example, a largest sequence number of currently sent packets that is recorded by the sending node is 8. When the sending node receives an acknowledgement packet whose sack is greater than 8, for example, receives an acknowledgement packet whose sack is 9, the sending node may determine that the retransmitted packet is lost. Sack is carried in an extension field (SACK) of the acknowledgement packet, and is used to indicate a sequence number of a packet received by the receiving node. It may be understood that the sending node may further detect, in another manner, whether the retransmitted packet is lost.

STEP2: Immediately retransmit the first packet again. "Immediately" herein refers to within a preset time interval after the sending node determines that the retransmitted packet is lost. The preset time interval uses a moment at which the sending node detects that the retransmitted first packet is lost as a start point. The preset time interval should be greater than or equal to 0, and be less than or even much less than the period of the timeout timer of the first packet. Preferably, the preset time interval is equal to 0 or approaches 0. If the preset time interval is equal to 0, it indicates that an action of detecting, by the sending node, that the retransmitted packet is lost and an action of retransmitting the first packet again are completed simultaneously or almost simultaneously.

STEP3: After retransmitting the first packet again, the sending node sends the first packet in the first time interval (t) for at least once. The first time interval (t) herein should be greater than or equal to 0, and be less than or even much less than the period of the timeout timer of the first packet. For example, if a timing period of a timeout timer of the sending node is T, t≤T, or t ≤T/2, or t≤T/4. Preferably, the first time interval uses a moment of retransmitting the first packet again as a start point. If the first time interval is equal to 0, it indicates that actions of sending the first packet in STEP2 and STEP3 are completed simultaneously or almost simultaneously. In addition, the sending node has not received, in the first time interval, the acknowledgement packet used to indicate that the first packet retransmitted again is lost. That is, when the sending node has not received the acknowledgement packet used to indicate that the first packet retransmitted again is lost (cannot determine whether the first packet retransmitted again is lost), the sending node redundantly sends the first packet.

Further, in an embodiment, an action of retransmitting the first packet in STEP2 and an action of sending the first packet in STEP3 are continuous, and the sending node has not sent another packet in the time interval t between the action of retransmitting the first packet in STEP2 and the action of sending the first packet in STEP3. For example, if a sequence number of the first packet retransmitted in STEP2 is N, a sequence number of the packet sent in STEP3 is N+1.

Optionally, after step 505, the method further includes:

Step 507: The sending node continues to send a subsequent packet.

Specifically, step 507 includes:

if a packet is currently allowed to be sent, further sending, by the sending node, at least one new packet. The new packet refers to a packet that is not sent by the sending node before. In an embodiment, the sending node may determine, according to a current sending buffer and/or a congestion control policy, whether the new packet is allowed to be sent. For example, if the sending buffer is not empty in the first time interval, the sending node sends at least one packet to the sending buffer in the first time interval.

In the embodiment described above, after detecting that a retransmitted packet is lost, a sending node repeatedly sends a first packet in a very time interval for twice or more than twice. In this way, the sending node may continuously receive acknowledgement packets, so that the retransmitted packet can be detected and recovered in time after being lost, thereby reducing a quantity of times of timeout retransmission, reducing a transmission delay, and improving a transmission rate. In addition, if the retransmitted packet is lost again, timeout retransmission may be triggered. However, if the retransmitted packet is fast retransmitted for multiple times in a short time, a probability that the retransmitted packet is lost is exponentially reduced, thereby further reducing a probability of timeout retransmission.

Figure 6:
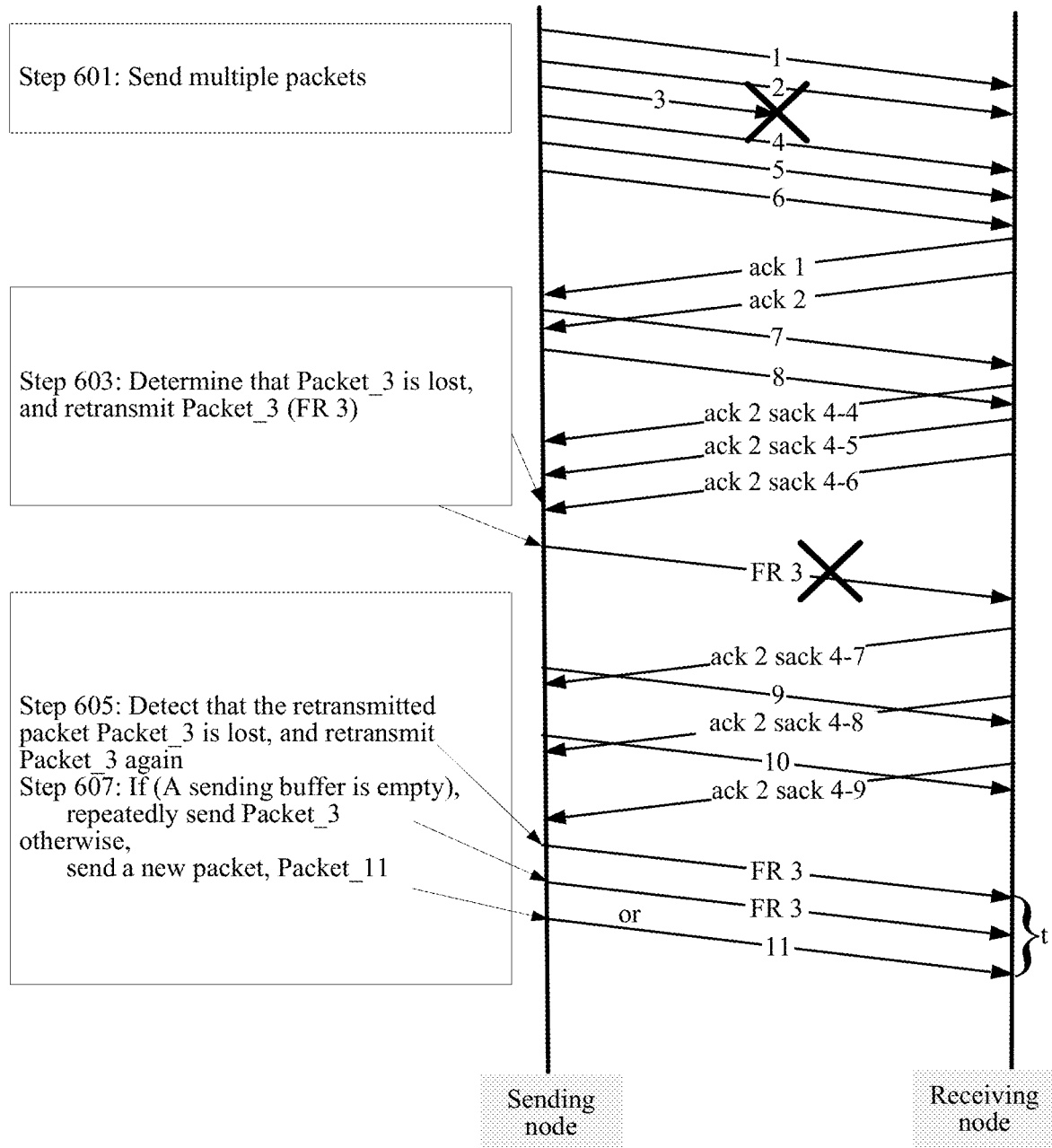
FIG. 6 is a schematic diagram of another packet transmission method according to an embodiment of the present invention.

Based on the foregoing embodiment, the present invention further provides another packet transmission method. As shown in FIG. 6, the method includes the following steps.

Step 601: A sending node transmits multiple packets (for example, packets 1 to 8 in FIG. 6) to a receiving node by using a communications link between the sending node and the receiving node. The packets are TCP packets. A sequence number field (Sequence Number, generally seq for short) of a header of each packet carries a sequence number of the first data byte in a payload of the packet. Optionally, after step 601, the sending node may further record a largest sequence number of the sent packets for subsequent packet loss detection.

Step 603: After determining that a first packet (for example, a packet 3 in FIG. 6) is lost, the sending node immediately retransmits the lost first packet, where the retransmitted first packet (that is, FR 3) is also referred to as a retransmitted packet.

Specifically, in step 603, the sending node receives an acknowledgement packet from the receiving node, and determines, based on the received acknowledgement packet, that the first packet (for example, a packet 3 in FIG. 6) in the multiple packets is lost. For a specific method of determining, by the sending node according to the acknowledgement packet, that the first packet is lost, refer to related descriptions of step 503. In another embodiment of the present invention, the first packet may be retransmitted for once or for multiple times after a timeout timer exceeds a preset time interval. "Immediately" in step 603 refers to within a preset time interval after it is determined that the first packet is lost. The preset time interval is greater than or equal to 0, and is less than or even much less than a period of the timeout timer of the first packet. Preferably, the preset time interval uses a moment of detecting that the retransmitted first packet is lost as a start point, and the preset time interval is equal to 0 or approaches 0.

Step 605: The sending node determines, according to an acknowledgement packet received after the first packet is retransmitted, that the retransmitted packet (that is, the retransmitted first packet FR3 in step 602) is lost, and immediately retransmits the first packet again. For a specific method of determining, by the sending node, that the retransmitted packet is lost, refer to related descriptions of STEP 1 in FIG. 5. Moreover, a related meaning and explanation of "immediately" in step 605 are similar to those described in step 505, and details are not described herein again.

Step 607: The sending node determines whether a sending buffer is empty, and if the sending buffer is empty, the sending node sends the first packet for at least once in the first time interval after retransmitting the first packet again. For a definition of the first time interval, refer to the embodiment shown in FIG. 5. Further, in another embodiment, the first time interval in step 607 may use a moment of retransmitting the first packet again as a start point, and use a moment of receiving the first acknowledgement packet after the first packet is retransmitted again as an end point. In this way, after retransmitting the first packet again, the sending node actually sends the first packet again before receiving the acknowledgement packet used to indicate that the first packet retransmitted again is lost.

It should be noted that the sending buffer in step 607 is configured to buffer to-be-sent data of an application, that is, data that is not sent by the sending node. A packet in the sending buffer is inserted into a sending queue at a particular time, and is sent from the sending queue. The sending queue may include a packet that is not sent by the sending node, and a retransmitted packet may also be inserted into the sending queue.

Further, as shown in FIG. 6, in an embodiment, step 607 further includes: if the sending buffer is not empty, sending, by the sending node, a second packet (for example, packet 11 in FIG. 6) in the sending buffer in the first time interval (t in FIG. 6) after retransmitting the first packet again. It may be understood that the second packet is a new packet, that is, a packet that is not sent before the sending node retransmits the first packet again.

In another embodiment, the foregoing steps 605 and 607 are completed in a preset time interval, that is, actions of retransmitting the first packet again, determining whether the sending buffer is empty, and redundantly sending the first packet or sending the second packet are completed in the preset time interval. The preset time interval is greater than or equal to 0, and is less than or even much less than the period of the timeout timer of the first packet. In addition, the sending node has not received, in the preset time interval, an acknowledgement packet used to indicate that the first packet retransmitted again is lost. That is, when the sending node has not received the acknowledgement packet used to indicate that the first packet retransmitted again is lost (cannot determine whether the first packet retransmitted again is lost), the sending node redundantly sends the first packet.

Further, in an embodiment, the sending node may collect status information in a process of transmitting a packet to the receiving node. Therefore, after retransmitting the first packet, the sending node can calculate, according to the collected status information, whether the sending node can immediately send a new packet after retransmitting the first packet. The status information includes but is not limited to at least one piece of the following information: a size of the sending buffer of the sending node, a size of a congestion window of the sending node, a congestion control policy of the sending node, or a size of a receive window of the receiving node. Correspondingly, in step 607, if the sending buffer of the sending node is not empty, and the congestion control policy of the sending node allows sending of a new packet, the sending node determines that the new packet is currently allowed to be sent, and further sends the new packet in the first time interval after retransmitting the first packet again. Alternatively, if the sending buffer of the sending node is not empty, and the congestion control policy of the sending node does not allow sending of a new packet, the sending node still determines that the new packet may be currently allowed to be sent, and sends the new packet in the first time interval (t) after retransmitting the first packet again. That is, in step 607, the sending node determines, merely according to the sending buffer, whether to send the new packet in the first time interval, but ignores a limitation of the congestion control policy. A specific method of ignoring the congestion control policy includes: after the sending node retransmits the lost packet again, if the sending buffer is not empty, temporarily increasing, by the sending node, the congestion window, to avoid the limitation of the congestion control policy in the first time interval, and rapidly send the new packet. Further, after sending the new packet, the sending node recovers the congestion window.

It should be noted that a difference between the packet transmission method in this embodiment of the present invention and the method shown in FIG. 5 is that in this embodiment of the present invention, the sending node does not repeatedly send the lost first packet in the first time interval for twice or more than twice each time after detecting that the retransmitted packet is lost, but further determines whether the new packet can be currently sent, and if yes, sends at least one new packet in the first time interval. Compared with the method shown in FIG. 5, by using the method in this embodiment of the present invention, when a probability of loss of a retransmitted packet is reduced, redundant sending of a packet is reduced, and the network transmission efficiency is improved.

Figure 7:
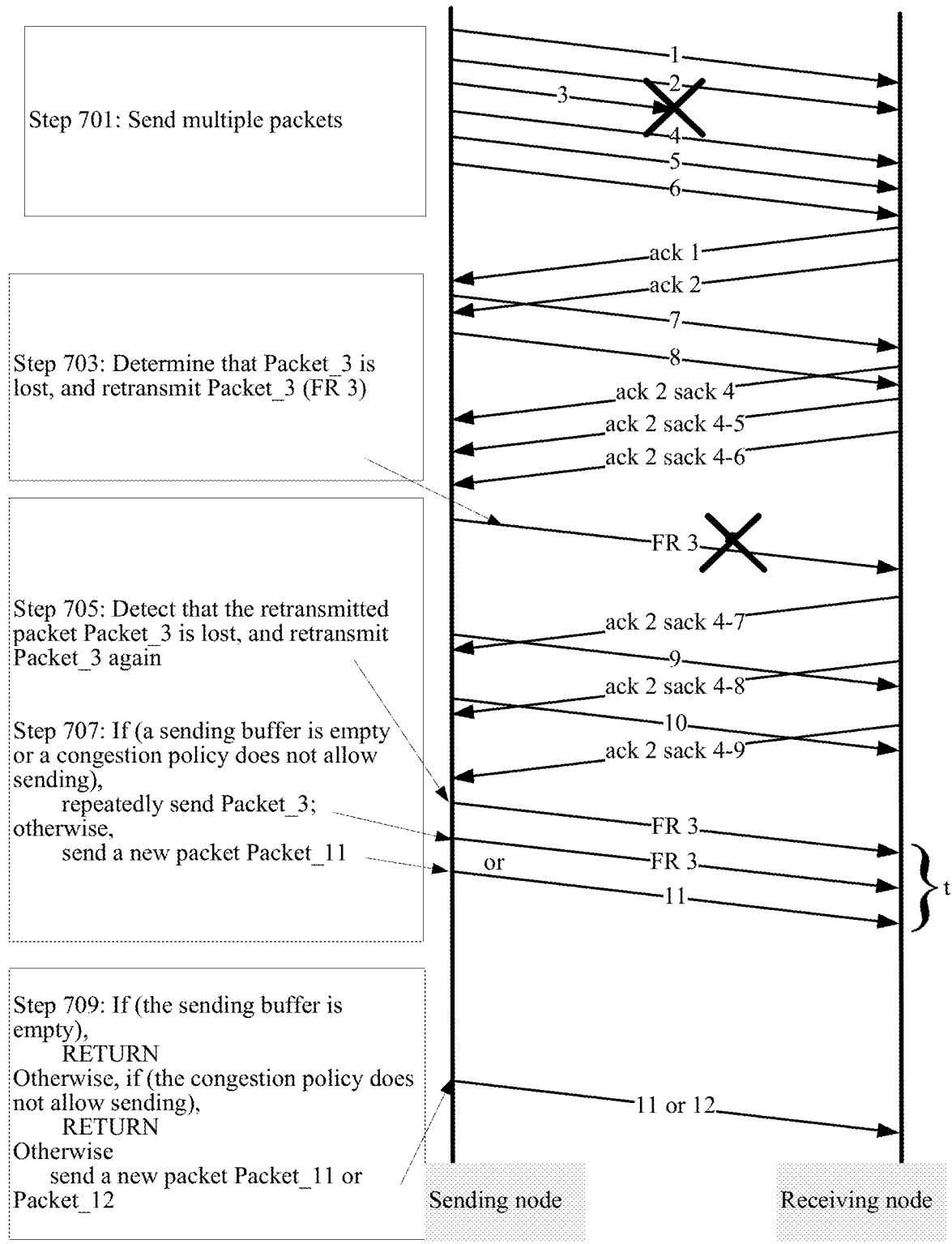
FIG. 7 is a schematic diagram of another packet transmission method according to an embodiment of the present invention.

Based on the method shown in FIG. 6, an embodiment of the present invention further provides another packet transmission method. As shown in FIG. 7, the method includes the following steps.

Step 701: A sending node transmits multiple packets (for example, packets 1 to 8 in FIG. 7) to a receiving node by using a communications link between the sending node and the receiving node.

Step 703: After determining that a first packet (for example, a packet 3 in FIG. 7) is lost, the sending node immediately retransmits the lost first packet, where the retransmitted first packet (that is, FR 3) is also referred to as a retransmitted packet. "Immediately" herein refers to within a time interval approaching 0. For details, refer to the related descriptions in the embodiments shown in FIG. 5 and FIG. 6.

Step 705: The sending node determines, according to an acknowledgement packet received after the first packet is retransmitted, that the retransmitted packet (that is, the retransmitted first packet FR3 in step 602) is lost, and immediately retransmits the first packet again. For a specific method of determining, by the sending node, that the retransmitted packet is lost, refer to related descriptions of STEP 1 in FIG. 5. In addition, a related meaning and explanation of "immediately" in step 705 are similar to those described in step 505 and step 605, and details are not described herein again.

Step 707: Determine whether a sending buffer is empty, and whether a congestion control policy allows sending of a new packet; if the sending buffer is empty, or the current congestion control policy does not allow sending of the new packet, the sending node sends the first packet in a first time interval (for example, t in FIG. 7) for at least once; otherwise, if the sending buffer is not empty, and the current congestion control policy allows sending of the new packet, the sending node sends at least one new packet in the first time interval. For a definition of the first time interval, refer to the method embodiment shown in FIG. 5, and details are not described again.

Further, as shown in FIG. 7, after step 707, the packet transmission method further includes:

Step 709: The sending node determines whether the sending buffer is empty, and if the sending buffer is empty, returns or waits; or if the sending buffer is not empty, determines whether the current congestion control policy allows sending of the new packet, and if the current congestion control policy does not allow sending of the new packet, returns or waits; or if the current congestion control policy allows sending of the new packet, sends the new packet.

Compared with the method shown in FIG. 6, in the method shown in FIG. 7, both the sending buffer and the congestion control policy are considered when it is determined whether to send the new packet, and the congestion control policy is conformed to because the new packet is not sent.

Figure 8:
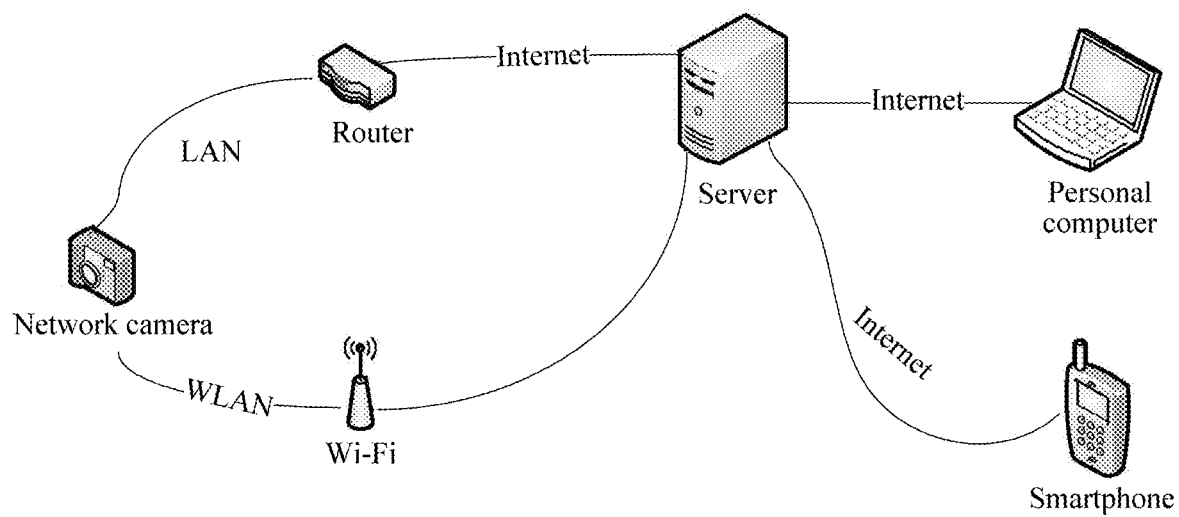
FIG. 8 is a schematic diagram of an application scenario of embodiments of the present invention.
Figure 9:
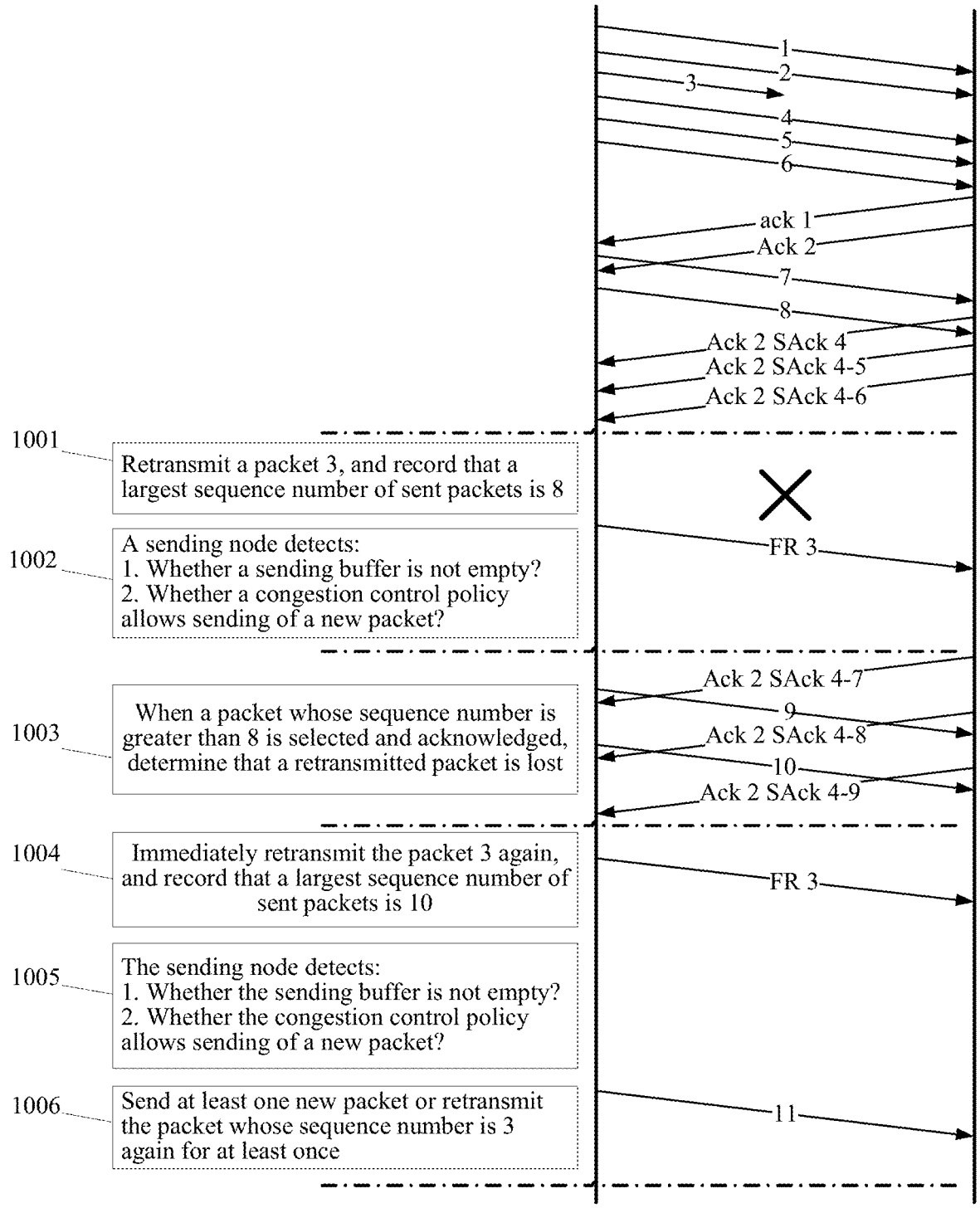
FIG. 9 is a schematic diagram of another packet transmission method according to an embodiment of the present invention.

Another packet transmission method in an embodiment of the present invention is described below based on a specific application scenario (a network video surveillance scenario). As shown in FIG. 8, it is assumed that a user watches, by using user equipment, a video taken by a remote network camera. A chip of the network camera integrates a light TCP/IP protocol stack. The protocol stack implements the packet transmission method in this embodiment of the present patent invention. It is assumed that a packet loss rate of a link is 5%. In a TCP packet transmission process, it is assumed that a packet 3 whose sequence number is 3 is lost. The packet transmission method in this embodiment of the present invention is shown in FIG. 9.

Step 1001: After detecting that the packet 3 is lost, the network camera retransmits the packet 3, and records that a largest sequence number of currently sent packets is 8.

Step 1002: When a sending buffer is not empty, and a congestion control policy allows sending of a new packet, a sending node continues to send a new packet.

Step 1003: When the third repeated ACK after the packet 3 is retransmitted is received, a sequence number of a cumulative acknowledgment is still 2 and is not updated, and a packet whose sequence number is 9 has been acknowledged, the network camera determines that the retransmitted packet is lost.

Step 1004: Immediately retransmit the packet 3 again, and record that a largest sequence number of currently sent packets is 10.

Step 1005: Determine, according to the sending buffer and the congestion control policy, whether to continue to send a new packet currently.

Step 1006: If the sending buffer is not empty, but the current congestion control policy does not allow sending of the new packet, immediately send at least one new packet; or if the sending buffer is empty, immediately send the packet 3 for at least once. "Immediately" described in this embodiment of the present invention refers to within a preset time interval. That is, the sending node redundantly sends the lost packet 3 for at least once or a new packet in a preset time interval after retransmitting the packet 3 again. The preset time interval herein should be greater than or equal to 0, and less than or even much less than a period of a timeout timer of the packet 3. For example, if the period of the timeout timer corresponding to the packet 3 is T, the preset time interval should be less than T, or less than T/2, or even less than T/4. Preferably, the preset time interval uses a moment of retransmitting the packet 3 again as a start point, and the network camera detects that an acknowledgement packet used to indicate that the packet 3 retransmitted again is lost has not been received in the preset time interval.

In the method in this embodiment of the present invention, after detecting that a packet is lost, the network camera retransmits the packet, and determines whether a new packet can be currently sent. If the new packet cannot be sent, the sending node redundantly sends the lost packet in a preset time interval. In this way, a probability of a packet loss can be reduced, and the data transmission efficiency can be improved.

Experimental results of this embodiment of the present invention that are obtained in different network environments of different packet loss rates are shown in Table 1 and Table 2. According to Table 1, in a scenario of transmitting 200 MB data, by using the packet transmission method in this embodiment of the present invention, a quantity of times of packet losses is 2 to 5 times less than that obtained by using a DAC method. As shown in Table 2, when the method of the present invention is used, a throughput is at least two times higher than a throughput obtained by using the DAC method. In a high packet loss rate scenario, the throughput exceeds that of a native protocol stack of Linux.

TABLE 1

Quantities of times of packet losses when 200 MB data is transmitted in scenarios of different packet loss rates

| Packet loss rate | 1% | 3% | 5% | 7% | 9% | 11% |
|---|---|---|---|---|---|---|
| DAC | 0 | 9 | 52 | 134 | 291 | 534 |
| Optimization | 0 | 0 | 8 | 31 | 84 | 169 |

TABLE 2

Throughputs when 200 MB data is transmitted in scenarios of different packet loss rates

| Packet loss rate | 1% | 3% | 5% | 7% | 9% | 11% |
|---|---|---|---|---|---|---|
| DAC | 11.31 MiB/s | 5.81 MiB/s | 1.99 MiB/s | 0.83 MiB/s | 0.36 MiB/s | 0.19 MiB/s |
| Optimization | 11.33 MiB/s | 11 MiB/s | 6.8 MiB/s | 2.87 MiB/s | 1.29 MiB/s | 0.65 MiB/s |
| Linux | 11.24 MiB/s | 8.7 MiB/s | 4.54 MiB/s | 1.96 MiB/s | 0.89 MiB/s | 0.53 MiB/s |

The method embodiments described in FIG. 5 to FIG. 7 are packet sending mechanisms after it is detected that a retransmitted packet is lost. It may be understood that in an optional embodiment of the present invention, after it is detected, for the first time, that a packet (for example, a first packet) is lost, the first packet may be continuously retransmitted in a first time interval for multiple times. In another embodiment, after the sending node detects, for the first time, that the first packet is lost, if a current sending buffer is not empty, the sending node continuously sends the first packet and at least one new packet in the first time interval; otherwise, the sending node continuously sends the first packet in the first time interval for at least twice. In another embodiment, after the sending node detects, for the first time, that the first packet is lost, if the current sending buffer is empty, or a current congestion control policy does not allow sending of a new packet, the sending node continuously sends the first packet in the first time interval for at least once; otherwise, continuously sends the first packet and at least one new packet.

As can be seen, the redundant packet-sending mechanism described in FIG. 5 to FIG. 7 of the present invention is not limited to being triggered after it is detected that a retransmitted packet is lost. In addition, a packet may be sent redundantly the first time when it is detected that the packet is lost.

Figure 10:
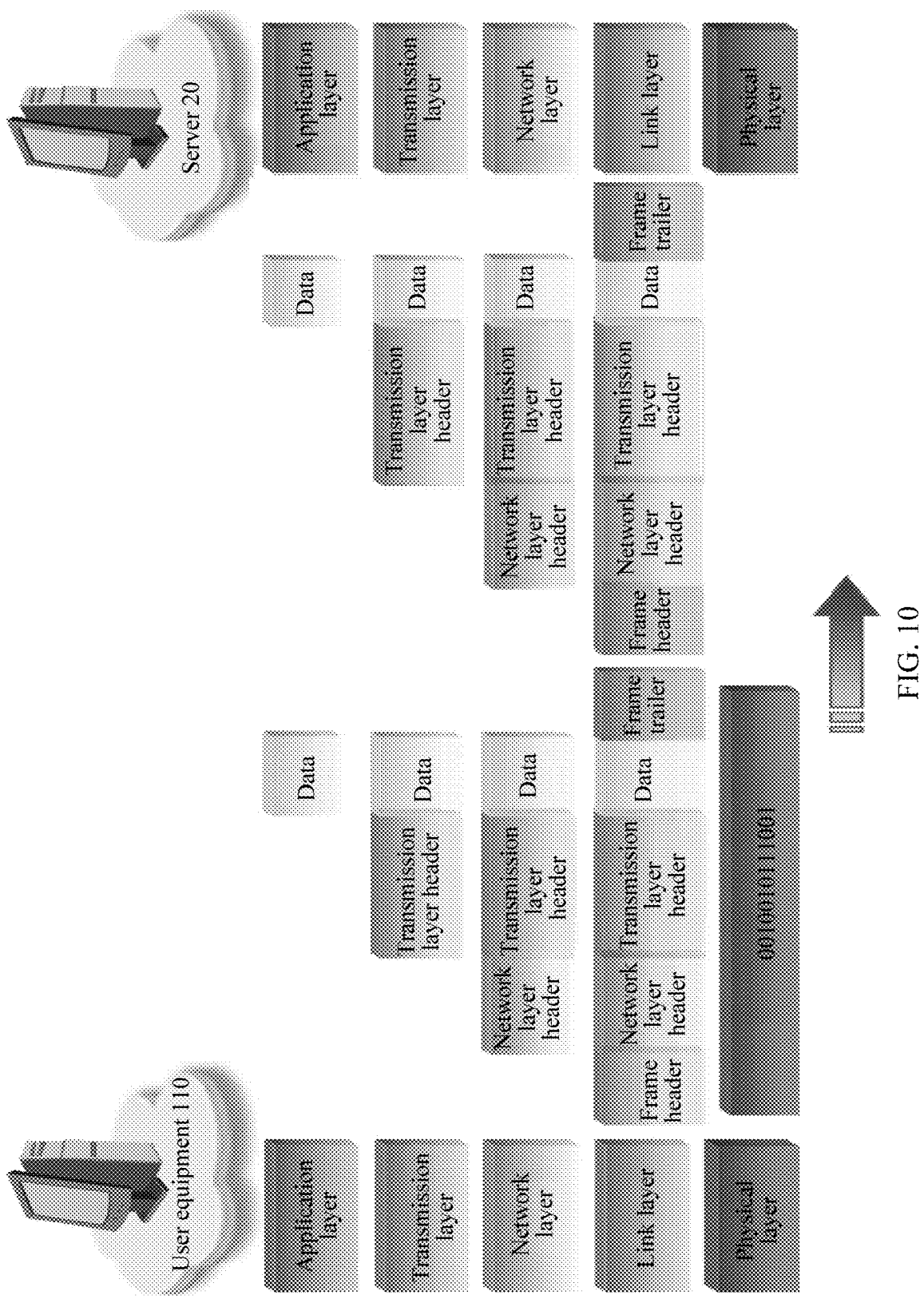
FIG. 10 is a diagram of a working principle of a TCP protocol stack according to an embodiment of the present invention.

Based on the foregoing method embodiments, the present invention further provides user equipment, to implement functions of the sending node in the foregoing method embodiments. Specifically, referring to FIG. 2, the user equipment 110 includes: the processor 120, the TCP protocol stack 130, the antenna 142, the wireless modem 140, and the memory 150. The wireless modem 140 is connected to the antenna 142. The TCP protocol stack 130 is configured to: encapsulate, under the control of the processor 120, data of an application program into multiple packets of a particular data format according to a TCP/IP protocol specification, and send the multiple packets to the wireless modem 140. The wireless modem 140 is configured to: modulate the received packets to analog signals, and transmit the analog signals by using the antenna. The application program server 20 may receive, by using a wireless network, the analog signals transmitted by the user equipment 110, demodulate the analog signals to digital signals, and send the digital signals to a TCP protocol stack 21 of the application program server 20. The TCP protocol stack 21 is configured to decapsulate the digital signals, to finally obtain the data of the application program. TCP protocol stacks of the user equipment 110 and the application program server 20 include: a physical layer, a link layer, a network layer, a transmission layer, and an application layer. A process in which a TCP protocol stack encapsulates and decapsulates a packet is shown in FIG. 10. As can be seen, an encapsulation process of the packet is actually a process of adding, by the TCP protocol stack, a header and/or a frame trailer to the packet, and a decapsulation process of the packet is actually a process of removing the header and/or the frame trailer from the packet.

Further, after receiving a packet sent by the user equipment 110, the application program server 20 returns an acknowledgement packet, to indicate that the packet have been received. The TCP protocol stack 130 is further configured to: determine, under the control of the processor 120 and according to the acknowledgement packet received from the application program server, that a first packet is lost; and continuously retransmit the first packet in a preset time interval for at least twice.

Preferably, in another embodiment, the TCP protocol stack 130 is further configured to perform some or all steps in FIG. 5, FIG. 6, or FIG. 7 under the control of the processor 120.

Figure 12:
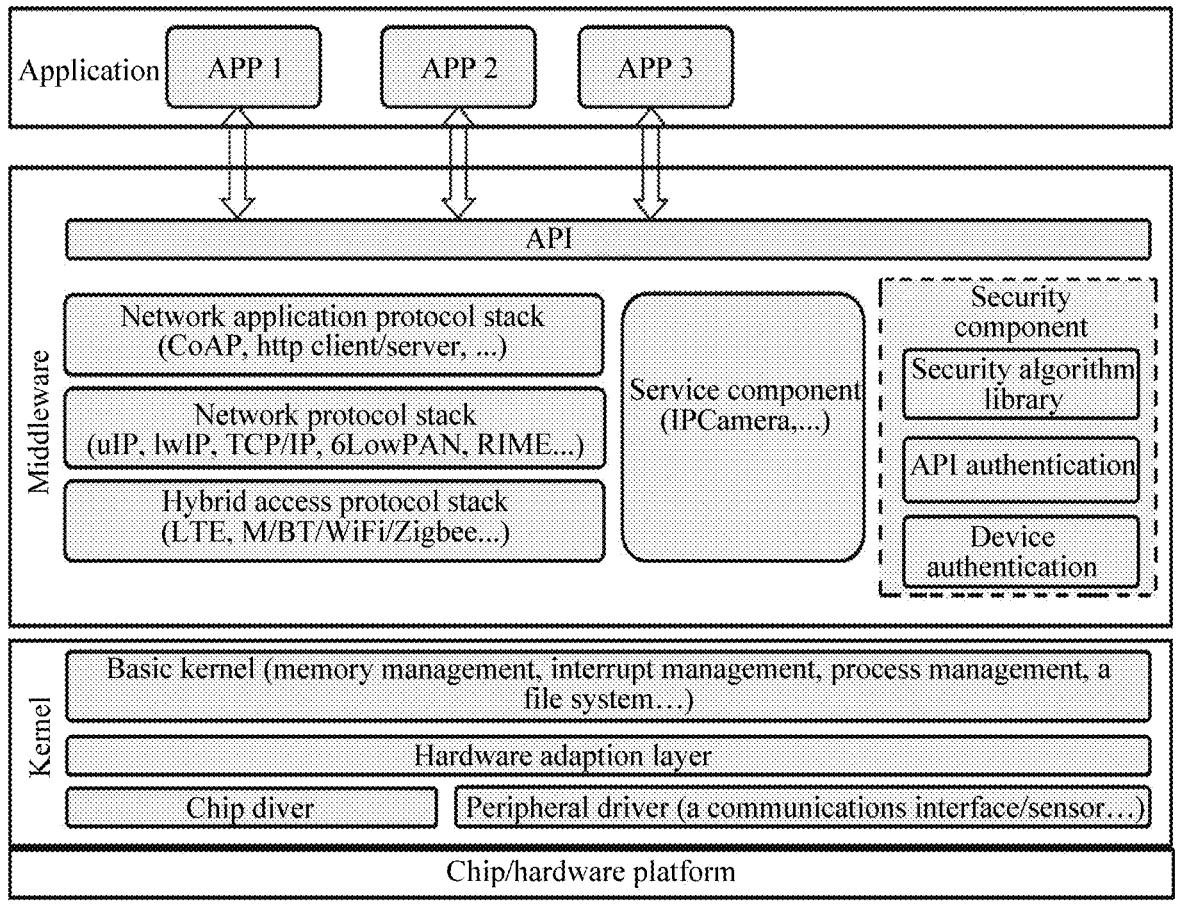
FIG. 12 is a schematic diagram of user equipment according to an embodiment of the present invention.

It should be noted that, the TCP protocol stack 130 may be executed by a proper combination of software, hardware, and/or firmware on the user equipment 110. For example, in an embodiment, the TCP protocol stack 130 is stored in the memory 150 in a form of executable program code. The processor 120 executes the program code corresponding to the TCP protocol stack 130, to perform some or all steps described in FIG. 5, FIG. 6, or FIG. 7. Specifically, as shown in FIG. 12, the user equipment 100 is divided, according to a logical hierarchy, into: a chip/hardware platform, a kernel on the chip/hardware platform, middleware, and an application program running on the middleware. The kernel, the middleware, and the application program are all stored in the memory 150 of the user equipment 110 in a manner of executable code. The processor parses the code into specific instructions and executes the instructions, to complete a corresponding function. An execution chip includes at least one of a general purpose processor, a microprocessor, a graphics processing unit, or a baseband processor. The hardware platform includes: a chip, a memory, a communications interface, and the like. The kernel specifically includes: a chip driver, a peripheral driver (for example, a communications interface and a sensor driver), a hardware adaption layer, and a basic kernel. The basic kernel provides functions such as memory management, interrupt management, process management, and a file system. The processor runs executable code corresponding to the kernel, to schedule a hardware resource to implement a particular function, for example, reading and writing data and generating a control instruction.

Further, the middleware, as a joint point between the kernel and an upper-layer application program, may include multiple types of protocol stacks, so that the user equipment supports different types of protocols. For example, the middleware may include the TCP protocol stack described in the foregoing embodiment. The middleware further includes an application programming interface (API) and different types of service components. The service components are developed for a particular application or service, and provide some extension functions for the application or the service. For an application scenario shown in FIG. 8, the service components may include a video component, configured to provide a video optimization function and/or a video coding and decoding function, so as to support an operation of a video surveillance application. The API is configured for interworking between the upper-layer application program, the middleware, and the kernel, to transfer a message. Optionally, the middleware further includes a security component, configured to implement authentication and authorization of a device.

Specifically, in a process in which an application program (for example, APP 1) is executed by the processor, the API may be invoked to transfer a data packet to a network protocol stack (for example, a TCP protocol stack). After sensing the packet, the TCP protocol stack invokes the hardware driver in the kernel by using a system function, to drive related hardware, for example, the wireless modem 140 and the antenna 142, to send, receive, and process the packet. In addition, a data packet loss detection and packet retransmission are also implemented by the processor by running the TCP protocol stack. For specific implementation details of packet loss detection and packet transmission by the TCP protocol stack, refer to the foregoing embodiments, and details are not described herein again.

In another embodiment, the TCP protocol stack 130 may be implemented by a hardware circuit or a dedicated chip such as a field programmable gate array (FPGA) or an application-specific integrated circuit (ASIC). In this case, the processor 120 and the TCP hardware circuit or the application-specific chip that is configured to implement the TCP protocol stack are connected by using a bus. The processor runs the application program in the memory 150, and invokes the TCP hardware circuit or the dedicated chip configured to implement the TCP protocol stack, so as to transmit and process data generated in a process of running the application program. Specifically, the processor 120 decodes code corresponding to the application program into machine instructions, executes the machine instructions one by one, and in a process of executing the instructions, invokes, by using a corresponding program, the TCP hardware circuit or the dedicated chip to send and receive a packet. Correspondingly, under invocation of the processor 120, the TCP hardware circuit or the dedicated chip cooperates with another piece of hardware to complete the steps or functions described in the method embodiments of the present invention. In addition, for related details of executing the foregoing method steps by the TCP hardware circuit or the application-specific chip of the TCP protocol stack, refer to the foregoing method embodiments, and details are not described herein again.

Figure 11:
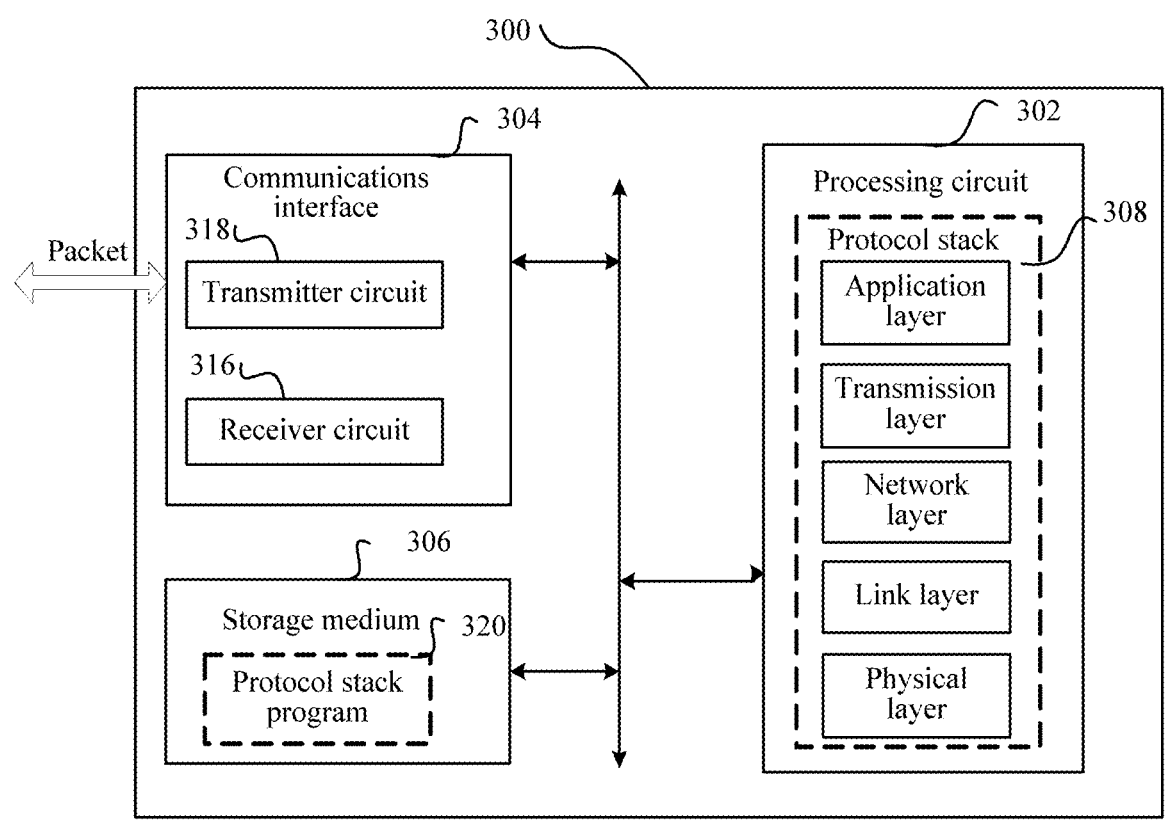
FIG. 11 is a schematic diagram of user equipment according to an embodiment of the present invention.

As shown in FIG. 11, an embodiment of the present invention further provides another user equipment 300, including: a processing circuit 302, and a communications interface 304 and a storage medium 320 that are connected to the processing circuit 302.

The processing circuit 302 is configured to: process and/or send data, control data access and storage, give a command, and control another device to perform an operation. The processing circuit 302 may be implemented as one or more processors, one or more controllers, and/or another structure that may be configured to execute a program and the like. The processing circuit 302 may specifically include: a general purpose processor, a digital signal processor (DSP), an application-specific integrated circuit (ASIC), a field programmable gate array (FPGA), or another programmable logical component. The general purpose processor may include: a microprocessor, and any normal processor, controller, microcontroller, or state machine. The processing circuit 302 may be implemented as a computing component, for example, a combination of the DSP and the microprocessor.

The storage medium 306 may include a computer readable storage medium such as a magnetic storage device (for example, a hard disk, a floppy disk, or a magnetic stripe), an optical storage medium (for example, a digital versatile disc (DVD)), a smartcard, a flash memory device, a random access memory (RAM), a read-only memory (ROM), a programmable ROM (PROM), an erasable PROM (EPROM), a register, or any combination thereof. The storage medium 306 may be coupled to the processing circuit 302, so that the processing circuit 302 can read information and write information to the storage medium 306. Specifically, the storage medium 306 may be integrated into the processing circuit 302, or the storage medium 306 and the processing circuit 302 may be separated.

The processing circuit 302 is adapted to execute a program stored in the storage medium 306. The term "program" used in this embodiment of the present invention should be widely understood as, including but not limited to: an instruction, an instruction set, code, a code segment, a subroutine, a software module, an application, a software package, a thread, a process, a function, firmware, middleware, and the like.

The communications interface 304 may include a circuit and/or a program to implement bidirectional communication between the user equipment 300 and one or more wireless network devices (for example, a network node). The communications interface 304 may be coupled to one or more antennas (not shown in FIG. 11), and include at least one receiver circuit 316 and/or at least one transmitter circuit 318. In an embodiment, the communications interface 304 may be implemented by a wireless modem entirely or partly.

In an embodiment, the storage medium 306 stores a protocol stack protocol 320. The processing circuit 302 executes the protocol stack protocol 320 to implement a function of the protocol stack module 308. The protocol stack module 308 may perform decoding and/or decapsulation processing on data received by the communications interface 304, and transfer the data to the upper-layer application program, or may perform encapsulation processing on data of the application program, and then send the data to another device by using the communications interface. For a specific working process of the protocol stack module 308, refer to the TCP protocol stacks 130 and 21 in the foregoing embodiment and related descriptions in FIG. 11.

In an embodiment, the protocol stack module 308 may include: a physical layer module, a data link layer module, a network layer module, a transmission layer module, and an application layer module, to implement protocols of layers. For example, the physical layer module may include a circuit and/or a program, configured to: define a physical device interface feature, a transmission medium type, a transmission rate, a transmission mode, and the like, and implement signal processing of a physical layer. Similarly, the data link layer module may include a circuit and/or a program, configured to implement a function of a data link layer, for example, responsible for delivering signaling generated by a network layer and processing information generated by the physical layer. The data link layer module may include one or more submodules, for example, a media access control (MAC) layer module, a radio link control (RLC) layer module, and a logical link control (LLC) layer module that are respectively configured to implement functions of a MAC layer, an RLC layer, and an LLC layer. For example, the MAC layer module is configured to: transmit upper-layer protocol data by using a service provided by the physical layer, and manage data access between an upper layer and an air interface. The RLC layer module is configured for data segmentation and reassembly. The LLC layer module is configured to provide a traffic and sequence control function and an error control function. Further, the network layer module may include a circuit and/or a program, to implement a function of a network layer, for example, logical addressing and routing. The transmission layer module may include a circuit and/or a program, configured to implement a function of a transmission layer, for example, port addressing, segmentation and reassembly, connection control, traffic control, and error control. The application layer module may include a circuit and/or a program, configured to provide an interface to an upper-layer application program.

According to one or more aspects of this embodiment of the present invention, the processing circuit 302 is adapted to execute the protocol stack protocol 320 stored in the storage medium 306, so as to implement a function of the protocol stack module 308. The protocol stack module 308 specifically implements some or all steps in the foregoing method embodiments.

Figure 13:
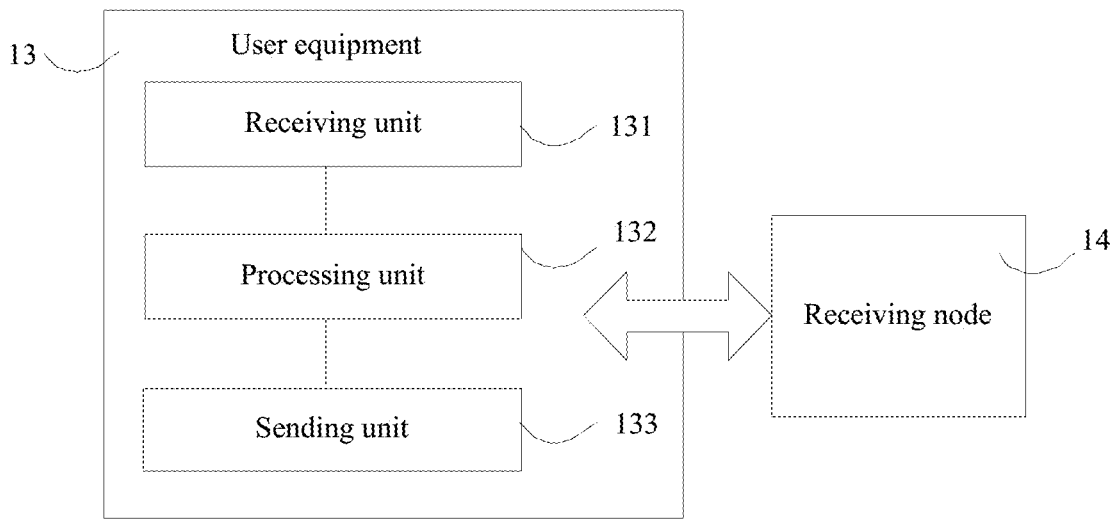
FIG. 13 is a schematic diagram of user equipment according to an embodiment of the present invention.

As shown in FIG. 13, an embodiment of the present invention further provides user equipment 13, to implement functions of the sending node in the foregoing method embodiments. The user equipment 13 includes: a receiving unit 131, a sending unit 133, and a processing unit 132.

The sending unit 133 is configured to send multiple packets to a receiving node 14 in communication connection with the user equipment 13.

The receiving unit 131 is configured to receive acknowledgement packets from the receiving node 14.

In an embodiment, the processing unit 132 is configured to: determine, according to the acknowledgement packets received by the receiving unit 131, that a first packet in the multiple packets is lost; and trigger the sending unit 133 to retransmit the first packet to the receiving node 14. Further, the processing unit 132 is further configured to: determine, according to an acknowledgement packet received by the receiving unit 131 after the first packet is retransmitted, that the retransmitted packet is lost, and immediately trigger the sending unit 133 to continuously send the first packet in a first time interval for at least twice, where the retransmitted packet is the retransmitted first packet. For detailed definitions of "immediately" and the "first time interval", refer to the foregoing method embodiments.

In another embodiment, the processing unit 132 is configured to: determine, according to the acknowledgement packets received by the receiving unit 131, that the first packet in the multiple packets is lost; and trigger the sending unit 133 to retransmit the first packet to the receiving node 14. Further, the processing unit 132 is further configured to: determine, according to the acknowledgement packet received by the receiving unit 131 after the first packet is retransmitted, that the retransmitted packet is lost, trigger the sending unit 133 to retransmit the first packet again, and determine whether a sending buffer is empty; and if the sending buffer is not empty, send at least one packet in the sending buffer in the first time interval, where the packet in the sending buffer is a packet that is not sent by the sending unit. Further, the processing unit 132 is further configured to: if the sending buffer is empty, trigger the sending unit 133 to send the first packet in the first time interval for at least once. For the detailed definition of the "first time interval", refer to the foregoing method embodiments.

In another embodiment, the processing unit 132 is configured to: determine, according to the acknowledgement packets received by the receiving unit 131, that the first packet in the multiple packets is lost; and trigger the sending unit 133 to retransmit the first packet to the receiving node 14. Further, the processing unit 132 is further configured to: determine, according to the acknowledgement packet received by the receiving unit 131 after the first packet is retransmitted, that the retransmitted packet is lost, trigger the sending unit 133 to retransmit the first packet again, and determine whether the sending buffer is empty, or whether a current congestion control policy allows sending of a new packet; and if the sending buffer is empty, or the current congestion control policy does not allow sending of the new packet, send the first packet in the first time interval for at least once. Further, the processing unit 132 is further configured to: if the sending buffer is not empty, and the current congestion control policy allows sending of the new packet, send at least one packet in the sending buffer in the first time interval, where the packet in the sending buffer is a packet that is not sent by the sending unit. For the detailed definition of the "first time interval", refer to the foregoing method embodiments.

It should be noted that for detailed working processes of the receiving unit 131, the sending unit 133, and the processing unit 132, refer to the foregoing method embodiments, and details are not described herein again.

An embodiment of the present invention further provides user equipment, including: a sending unit, a receiving unit, and a processing unit.

The sending unit is configured to send multiple packets to a receiving node in communication connection with the user equipment.

The receiving unit is configured to receive multiple acknowledgement packets from the receiving node.

In an embodiment, the processing unit is configured to: determine, according to the multiple acknowledgement packets received by the receiving unit, that a first packet in the multiple packets is lost, trigger the sending unit to immediately retransmit the first packet to the receiving node, and send the first packet in a second time interval for at least once, where the second time interval is greater than or equal to 0, and is less than a period of a timeout timer of the first packet, and a sending node has not received, in the second time interval, an acknowledgement packet used to indicate that the retransmitted first packet is lost. In addition, "immediately" described herein refers to within a preset time interval after it is determined that the first packet is lost. The preset time interval is greater than or equal to 0, and is less than or even much less than the period of the timeout timer of the first packet. Preferably, the preset time interval is equal to 0 or approaches 0.

In another embodiment, the processing unit is configured to: determine, according to the multiple acknowledgement packets received by the receiving unit, that the first packet in the multiple packets is lost; and trigger the sending unit to immediately retransmit the first packet to the receiving node. Further, the processing unit is further configured to: determine whether a sending buffer is empty, and if the sending buffer is empty, trigger the sending unit to send the first packet in the second time interval for at least once. Further, the processing unit is further configured to: if the sending buffer is not empty, trigger the sending unit to send at least one packet in the sending buffer in the first time interval, where the packet in the sending buffer is a packet that is not sent by the sending unit. The second time interval is greater than or equal to 0, and is less than the period of the timeout timer of the first packet, and the sending node has not received, in the second time interval, the acknowledgement packet used to indicate that the retransmitted first packet is lost. In addition, "immediately" described herein refers to within a preset time interval after it is determined that the first packet is lost. The preset time interval is greater than or equal to 0, and is less than or even much less than the period of the timeout timer of the first packet. Preferably, the preset time interval is equal to 0 or approaches 0.

In another embodiment, the processing unit is configured to: determine, according to the multiple acknowledgement packets received by the receiving unit, that the first packet in the multiple packets is lost; and trigger the sending unit to immediately retransmit the first packet to the receiving node. Further, the processing unit is further configured to: determine whether the sending buffer is empty, or whether a current congestion control policy allows sending of a new packet; and if the sending buffer is empty, or the current congestion control policy does not allow sending of the new packet, trigger the sending unit to send the first packet in the second time interval for at least once. Further, the processing unit is further configured to: if the sending buffer is not empty, and the current congestion control policy allows sending of the new packet, trigger the sending unit to send at least one packet in the sending buffer in the second time interval, where the packet in the sending buffer is a packet that is not sent by the sending unit. The second time interval is greater than or equal to 0, and is less than the period of the timeout timer of the first packet, and the sending node has not received, in the second time interval, the acknowledgement packet used to indicate that the retransmitted first packet is lost. In addition, "immediately" described herein refers to within a preset time interval after it is determined that the first packet is lost. The preset time interval is greater than or equal to 0, and is less than or even much less than the period of the timeout timer of the first packet. Preferably, the preset time interval is equal to 0 or approaches 0.

A person of ordinary skill in the art may understand that all or some of the steps of the methods in the embodiments may be implemented by a program instructing relevant hardware (such as a processor). The program may be stored in a computer readable storage medium. The storage medium may include: a ROM, a RAM, a magnetic disk, or an optical disc.

The packet transmission method and the user equipment that are provided in the embodiments of the present invention are described in detail above. In this specification, specific examples are used to describe the principle and implementation manners of the present invention, and the descriptions of the embodiments are only intended to help understand the method and core idea of the present invention. In addition, a person of ordinary skill in the art may, based on the idea of the present invention, make modifications with respect to the specific implementation manners and the application scope. Therefore, the content of this specification shall not be construed as a limitation to the present invention.

What is claimed is:

1. A method performed by a sending node in a wireless network for transmitting data to a receiving node, comprising:

transmitting multiple packets to the receiving node;

receiving at least one first acknowledgement packet from the receiving node, wherein each of the at least one first acknowledgement packet is corresponding to a packet in the multiple packets that has been acknowledged receipt by the receiving node;

determining, according to the at least one first acknowledgement packet that a first packet in the multiple packets is lost, transmitting a first retransmission of the first packet;

determining, according to at least one second acknowledgement packet received from the receiving node after the first retransmission, that the first retransmission of the first packet is lost, transmitting a second retransmission of the first packet, and transmitting a third retransmission of the first packet within a first time interval after the second retransmission without receiving any acknowledgement packet for determining the second retransmission of the first packet is lost, wherein each of the at least one second acknowledge packet is corresponding to a packet in the multiple packets that has been transmitted after the first transmission and acknowledged receipt by the receiving node, and the first time interval is less than a period of a timeout timer set for the first packet.

2. The method according to claim 1, wherein each of the first acknowledgement packet carries information indicating a sequence number of a packet that has been acknowledged receipt by the receiving node, and the step of determining the first packet is lost determines, according to the information carried in the at least one first acknowledgement packet, that the first packet is lost.

3. The method according to claim 1, further comprising: establishing a TCP connection with the receiving node; and wherein the transmitting step transmits the multiple packets to the receiving node using the TCP connection.

4. User equipment, comprising: a wireless modem, a processor, an antenna, and a memory coupled to the processor, wherein the processor is configured to execute programming stored in the memory to:

transmit multiple packets to a server using the wireless modem and the antenna;

receive at least one first acknowledgement packet from the server using the wireless modem and the antenna, wherein each of the at least one first acknowledgement packet is corresponding to a packet in the multiple packets that has been acknowledged receipt by the server;

determine, according to the at least one first acknowledgement packet that a first packet in the multiple packets is lost, transmit a first retransmission of the first packet;

determine, according to at least one second acknowledgement packet received from the server after the first retransmission, that the first retransmission of the first packet is lost, transmit a second retransmission of the first packet, and transmit a third retransmission of the first packet in a first time interval after the second retransmission without receiving any acknowledgement packet for determining the second retransmission of the first packet is lost, wherein each of the at least one second acknowledge packet is corresponding to a packet in the multiple packets that has been transmitted after the first transmission and acknowledged receipt by the server, and the first time interval is less than a period of a timeout timer set for the first packet.

5. The user equipment according to claim 4, wherein each of the first acknowledgement packet carries information indicating a sequence number of a packet that has been acknowledged receipt by the server, the processor is configured to determine, according to the information carried in the at least one first acknowledgement packet, that the first packet is lost.

6. The user equipment according to claim 4, wherein the processor is configured to establish, prior to transmitting the multiple packets, a TCP connection between with the server; and wherein the multiple packets are transmitted using the TCP connection.

7. User equipment, comprising: a wireless modem, a processor, an antenna, and a memory coupled to the processor, wherein the processor is configured to execute programming stored in the memory to:

transmit multiple packets to a server using the wireless modem and the antenna;

receive at least one first acknowledgement packet from the server using the wireless modem and the antenna, wherein each of the at least one first acknowledgement packet is corresponding to a packet in the multiple packets that has been acknowledged receipt by the server;

determine, according to the at least one first acknowledgement packet, that a first packet in the multiple packets is lost, transmit a first retransmission of the first packet using the wireless modem and the antenna;

determine, according to at least one second acknowledgement packet received after the first retransmission, that the first retransmission of the first packet is lost, transmit a second retransmission of the first packet, and determine whether a sending buffer is empty, wherein each of the at least one second acknowledge packet is corresponding to a packet in the multiple packets that has been transmitted after the first transmission and acknowledged receipt by the server;

when the sending buffer is empty, transmit a third retransmission of the first packet in a first time interval after the second retransmission without receiving any acknowledgement packet for determining the second retransmission of the first packet is lost; or when the sending buffer is not empty, transmit at least one packet in the sending buffer to the server in the first time interval, wherein the first time interval is less than a period of a timeout timer set for the first packet.

8. The user equipment according to claim 7, wherein each of the first acknowledgement packet carries information indicating a sequence number of a packet that has been acknowledged receipt by the server, and the processor is configured to determine, according to the information carried in the at least one first acknowledgement packet, that the first packet is lost.

9. The user equipment according to claim 7, wherein the processor is configured to establish, prior to transmitting the multiple packets, a TCP connection with the server; and wherein the multiple packets are transmitted using the TCP connection.

* * * * *